US008552095B1

(12) United States Patent
Grcev et al.

(10) Patent No.: US 8,552,095 B1
(45) Date of Patent: Oct. 8, 2013

(54) FLAME-RETARDANT POLYMER COMPOSITION AND ARTICLE

(71) Applicants: Snezana Grcev, Bergen op Zoom (NL); Arno Hagenaars, Berendrect (NL)

(72) Inventors: Snezana Grcev, Bergen op Zoom (NL); Arno Hagenaars, Berendrect (NL)

(73) Assignee: Sabic Innovations Plastics IP B.V. (NL)

( * ) Notice: Subject to any disclaimer, the term of this patent is extended or adjusted under 35 U.S.C. 154(b) by 0 days.

(21) Appl. No.: 13/626,363

(22) Filed: Sep. 25, 2012

(51) Int. Cl.
*C08K 5/5313* (2006.01)
(52) U.S. Cl.
USPC .......................................... 524/126; 524/133
(58) Field of Classification Search
USPC ................. 524/126, 133
See application file for complete search history.

(56) References Cited

U.S. PATENT DOCUMENTS

| | | |
|---|---|---|
| 3,185,719 A | 5/1965 | Prober |
| 3,847,867 A | 11/1974 | Heath et al. |
| 3,850,885 A | 11/1974 | Takekoshi et al. |
| 3,852,242 A | 12/1974 | White |
| 3,855,178 A | 12/1974 | White et al. |
| 3,972,902 A | 8/1976 | Heath et al. |
| 3,983,093 A | 9/1976 | Williams et al. |
| 4,092,294 A | 5/1978 | Bennett, Jr. et al. |
| 4,404,350 A | 9/1983 | Ryang |
| 4,443,591 A | 4/1984 | Schmidt et al. |
| 4,455,410 A | 6/1984 | Giles, Jr. |
| 4,808,686 A | 2/1989 | Cella et al. |
| 4,942,206 A | 7/1990 | White et al. |
| 5,280,085 A | 1/1994 | Rock et al. |
| 7,332,534 B2 | 2/2008 | Knop et al. |
| 8,013,251 B2 | 9/2011 | Bhandari et al. |
| 8,017,697 B2 | 9/2011 | Carrillo et al. |
| 2003/0004268 A1 | 1/2003 | Sundararaj et al. |
| 2008/0223602 A1 | 9/2008 | Gallucci et al. |
| 2011/0152420 A1 | 6/2011 | Elkovitch et al. |

FOREIGN PATENT DOCUMENTS

JP    1998007900 A    1/1998

OTHER PUBLICATIONS

Horold et al., "A New Generation of Flame Retarded Polyamides Based on Phosphinates", Clariant GmBH, Division Pigments & Additives, downloaded from http://ec.europa.eu/environment/waste/stakeholders/individual_bus/clariant/att_2.pdf on Sep. 5, 2012, 7 pages.
UTLEM Resin 1010, SABIC Innovative Plastics Product Data Sheet, 2012, 3 pages.
ULTEM Resin STM1600, SABIC Innovative Plastics Product Data Sheet, 2012, 4 pages.
ULTEM 2410, GE Plastics Product Data Sheet, Nov. 6, 2001, 4 pages.

*Primary Examiner* — Peter Szekely
(74) *Attorney, Agent, or Firm* — Cantor Colburn LLP

(57) ABSTRACT

A flame-retardant polymer composition includes specific amounts of polyamide, acid-functionalized poly(phenylene ether), polyimide, and metal dialkylphosphinate. The composition, which exhibits improved flame retardancy and tensile modulus relative to known blends of poly(phenylene ether), polyamide, and polyimide, is useful for forming electrical components, such as photovoltaic junction boxes and connectors, inverter housings, automotive electrical connectors, electrical relays, and charge couplers.

18 Claims, No Drawings

FLAME-RETARDANT POLYMER COMPOSITION AND ARTICLE

BACKGROUND OF THE INVENTION

Poly(phenylene ether) is a type of plastic known for its excellent water resistance, dimensional stability, and inherent flame retardancy. Properties such as strength, stiffness, chemical resistance, and heat resistance can be tailored by blending it with various other plastics in order to meet the requirements of a wide variety of consumer products, for example, plumbing fixtures, electrical boxes, automotive parts, and insulation for wire and cable.

Blends of poly(phenylene ether) with polyamide and polyimide are known. See, for example, Japanese Patent Application Publication No. JP10007900 A of Takatani, describing such a blend in which poly(phenylene ether) and polyimide are dispersed in a continuous polyamide phase. The Takatani compositions provide improved compatibility of the poly (phenylene ether) and polyimide, but their flame retardancy and tensile modulus are inadequate for some applications, such as photovoltaic junction boxes and connectors, and seats in mass transit vehicles. There remains a desire for blends of poly(phenylene ether), polyamide, and polyimide exhibiting improved flame retardancy and improved tensile modulus.

BRIEF SUMMARY OF EMBODIMENTS OF THE INVENTION

One embodiment is a composition comprising the product of melt blending: 40 to 70 weight percent polyamide; 20 to 50 weight percent acid-functionalized poly(phenylene ether); 5 to 30 weight percent polyimide; and an amount of metal dialkylphosphinate effective to provide a flammability rating of V-1 or V-0 in the 20 mm Vertical Burning Flame Test of Underwriter's Laboratory Bulletin 94 "Tests for Flammability of Plastic Materials, UL 94"; wherein all weight percents are based on the total weight of the composition.

Another embodiment is an article comprising a composition comprising the product of melt blending: 40 to 70 weight percent polyamide; 20 to 50 weight percent acid-functionalized poly(phenylene ether); 5 to 30 weight percent polyimide; and an amount of metal dialkylphosphinate effective to provide a flammability rating of V-1 or V-0 in the 20 mm Vertical Burning Flame Test of Underwriter's Laboratory Bulletin 94 "Tests for Flammability of Plastic Materials, UL 94"; wherein all weight percents are based on the total weight of the composition.

These and other embodiments are described in detail below.

DETAILED DESCRIPTION OF THE INVENTION

The present composition is a blend of polyamide, acid-functionalized poly(phenylene ether), and polyimide that exhibits improved flame retardancy and improved tensile modulus. Thus, one embodiment is a composition comprising the product of melt blending: 40 to 70 weight percent polyamide; 20 to 50 weight percent acid-functionalized poly(phenylene ether); 5 to 30 weight percent polyimide; and an amount of metal dialkylphosphinate effective to provide a flammability rating of V-1 or V-0 in the 20 mm Vertical Burning Flame Test of Underwriter's Laboratory Bulletin 94 "Tests for Flammability of Plastic Materials, UL 94"; wherein all weight percents are based on the total weight of the composition.

The components melt blended to form the composition include a polyamide. In some embodiments, the polyamide comprises polyamide-6, polyamide-6,6, polyamide-4,6, polyamide-11, polyamide-12, polyamide-6,10, polyamide-6,12, polyamide 6/6,6, polyamide-6/6,12, polyamide MXD,6 (where MXD is m-xylylene diamine), polyamide-6,T, polyamide-6,I, polyamide-6/6,T, polyamide-6/6,I, polyamide-6,6/6,T, polyamide-6,6/6,I, polyamide-6/6,T/6,I, polyamide-6,6/6,T/6,I, polyamide-6/12/6,T, polyamide-6,6/12/6,T, polyamide-6/12/6,I, polyamide-6,6/12/6,I, or a combination thereof. In some embodiments, the polyamide comprises polyamide-6, polyamide-6,6, or a combination thereof. In some embodiments, the polyamide comprises polyamide-6.

In some embodiments, the polyamide has a relative viscosity of 100 to 150 measured at 23° C. according to ASTM D789-07 in 90% formic acid. In some embodiments, the polyamide has an amine end group concentration of less than 100 microequivalents amine end group per gram of polyamide. The amine end group concentration can be 20 to 100 microequivalents per gram, specifically 30 to 80 microequivalents per gram, more specifically 40 to 70 microequivalents per gram Amine end group content can be determined by dissolving the polyamide in a suitable solvent and titrating with 0.01 Normal hydrochloric acid (HCl) solution using a suitable indication method. The amount of amine end groups is calculated based the volume of HCl solution added to the sample, the volume of HCl used for the blank, the molarity of the HCl solution, and the weight of the polyamide sample. Methods for the preparation of polyamides are known, and many polyamides are commercially available.

The polyamide is used in an amount of 40 to 70 weight percent, based on the total weight of the composition (which is equivalent to the total weight of melt blended components). Within this range, the polyamide amount can be 42 to 60 weight percent, specifically 42 to 50 weight percent.

In addition to the polyamide, the components melt blended to form the composition include an acid-functionalized poly(phenylene ether). The acid-functionalized poly(phenylene ether) is the product of melt blending a poly(phenylene ether) and an acid functionalizing agent that contains a carboxylic acid and/or a carboxylic acid anhydride, and an aliphatic carbon-carbon double bond or triple bond. Poly(phenylene ether)s suitable to prepare the acid-functionalized poly(phenylene ether) include those comprising repeating structural units having the formula

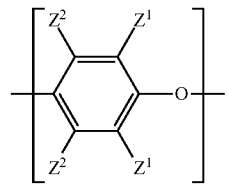

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

The poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations thereof.

In some embodiments, the poly(phenylene ether) used to form the acid-functionalized poly(phenylene ether) comprises a poly(phenylene ether)-polysiloxane block copolymer. As used herein, the term "poly(phenylene ether)-polysiloxane block copolymer" refers to a block copolymer comprising at least one poly(phenylene ether) block and at least one polysiloxane block.

In some embodiments, the poly(phenylene ether)-polysiloxane block copolymer is prepared by an oxidative copolymerization method. In this method, the poly(phenylene ether)-polysiloxane block copolymer is the product of a process comprising oxidatively copolymerizing a monomer mixture comprising a monohydric phenol and a hydroxyaryl-terminated polysiloxane. In some embodiments, the monomer mixture comprises 70 to 99 parts by weight of the monohydric phenol and 1 to 30 parts by weight of the hydroxyaryl-terminated polysiloxane, based on the total weight of the monohydric phenol and the hydroxyaryl-terminated polysiloxane. The hydroxyaryl-diterminated polysiloxane can comprise a plurality of repeating units having the structure

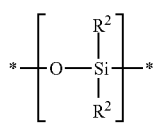

wherein each occurrence of $R^2$ is independently hydrogen, $C_1$-$C_{12}$ hydrocarbyl or $C_1$-$C_{12}$ halohydrocarbyl; and two terminal units having the structure

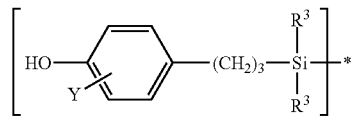

wherein Y is hydrogen, $C_1$-$C_{12}$ hydrocarbyl, $C_1$-$C_{12}$ hydrocarbyloxy, or halogen, and wherein each occurrence of $R^3$ is independently hydrogen, $C_1$-$C_{12}$ hydrocarbyl or $C_1$-$C_{12}$ halohydrocarbyl. In a very specific embodiment, each occurrence of $R^2$ and $R^3$ is methyl, and Y is methoxy.

In some embodiments, the monohydric phenol comprises 2,6-dimethylphenol, and the hydroxyaryl-terminated polysiloxane has the structure

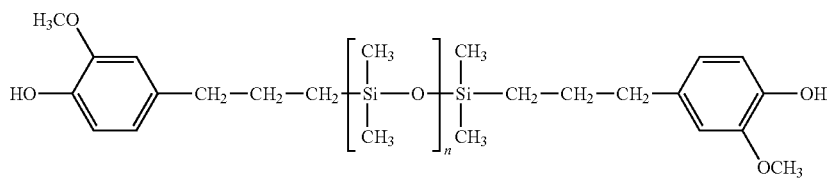

wherein n is, on average, 5 to 100.

The oxidative copolymerization method produces poly(phenylene ether)-polysiloxane block copolymer as the desired product and poly(phenylene ether) (without an incorporated polysiloxane block) as a by-product. It is not necessary to separate the poly(phenylene ether) from the poly(phenylene ether)-polysiloxane block copolymer. The poly(phenylene ether)-polysiloxane block copolymer can thus be utilized as a "reaction product" that includes both the poly(phenylene ether) and the poly(phenylene ether)-polysiloxane block copolymer. Certain isolation procedures, such as precipitation from isopropanol, make it possible to assure that the reaction product is essentially free of residual hydroxyaryl-terminated polysiloxane starting material. In other words, these isolation procedures assure that the polysiloxane content of the reaction product is essentially all in the form of poly(phenylene ether)-polysiloxane block copolymer. Detailed methods for forming poly(phenylene ether)-polysiloxane block copolymers are described in U.S. Pat. No. 8,017,697 to Carrillo et al., and U.S. patent application Ser. No. 13/169,137 of Carrillo et al., filed Jun. 27, 2011.

In some embodiments, the poly(phenylene ether) used to form the acid-functionalized poly(phenylene ether) has an intrinsic viscosity of 0.25 to 1 deciliter per gram measured by Ubbelohde viscometer at 25° C. in chloroform. Within this range, the poly(phenylene ether) intrinsic viscosity can be 0.3 to 0.65 deciliter per gram, more specifically 0.35 to 0.5 deciliter per gram, even more specifically 0.4 to 0.5 deciliter per gram. In the reaction of the poly(phenylene ether) with the acid functionalizing agent, the intrinsic viscosity of the poly(phenylene ether) starting material is equivalent to that of the acid-functionalized poly(phenylene ether) product. Thus, the intrinsic viscosity ranges recited in this paragraph apply to the acid-functionalized poly(phenylene ether) as well as the poly(phenylene ether).

As mentioned above, the acid-functionalized poly(phenylene ether) is the product of melt blending a poly(phenylene ether) and an acid functionalizing agent that contains a carboxylic acid and/or a carboxylic acid anhydride, and an aliphatic carbon-carbon double bond or triple bond. In some embodiments, the acid functionalizing agent comprises citric acid, fumaric acid, maleic acid, maleic anhydride, or a combination thereof. In some embodiments, the acid-functionalized poly(phenylene ether) is the product of melt blending 95 to 99.5 parts by weight of a poly(phenylene ether) with 0.5 to 5 parts by weight of an acid functionalizing agent selected from the group consisting of citric acid, fumaric acid, maleic acid, maleic anhydride, and combinations thereof, wherein the sum of the poly(phenylene ether) and the acid functionalizing agent is 100 parts by weight. Within the range of 95 to 99.5 parts by weight, the amount of poly(phenylene ether) can be 96 to 99 parts by weight, specifically 97 to 98.5 parts by weight. Within the range of 0.5 to 5 parts by weight, the acid functionalizing agent amount can be 1 to 4 parts by weight, specifically 1.5 to 3 parts by weight.

In some embodiments, the poly(phenylene ether) used to form the acid-functionalized poly(phenylene ether) comprises a homopolymer or copolymer of monomers selected from the group consisting of 2,6-dimethylphenol, 2,3,6-trimethylphenol, and combinations thereof. In some embodiments, the poly(phenylene ether) used to form the acid-functionalized poly(phenylene ether) comprises a poly(phenylene ether)-polysiloxane block copolymer. In these embodiments, the acid-functionalized poly(phenylene ether) can, for example, contribute 0.4 to 4 weight percent, specifically 0.8 to 3 weight percent, more specifically 1.2 to 2 weight percent, of siloxane groups to the composition as a whole.

The acid-functionalized poly(phenylene ether) can be used in an amount of 20 to 50 weight percent, based on the total weight of the composition. Within this range, the acid-functionalized poly(phenylene ether) amount can be 25 to 48 weight percent, specifically 30 to 45 weight percent.

In addition to the polyamide and the acid-functionalized poly(phenylene ether), the components melt blended to form the composition include a polyimide. A polyimide is a polymer comprising a plurality of repeating units having the structure

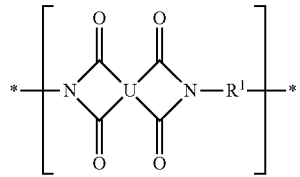

wherein U is independently at each occurrence a tetravalent linker selected from the group consisting of substituted or unsubstituted, saturated, unsaturated, or aromatic monocyclic and polycyclic groups having 5 to 50 carbon atoms, substituted or unsubstituted alkyl groups having 1 to 30 carbon atoms, and substituted or unsubstituted alkenyl groups having 2 to 30 carbon atoms; and $R^1$ is independently at each occurrence a divalent group selected from the group consisting of substituted or unsubstituted divalent aromatic hydrocarbon moieties having 6 to 20 carbons, straight or branched chain alkylene moieties having 2 to 20 carbons, cycloalkylene moieties having 3 to 20 carbon atom, and divalent moieties of the general formula

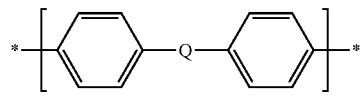

wherein Q is selected from the group consisting of —O—, —S—, —C(O)—, —S(O)$_2$—, —S(O)—, and —C$_y$H$_{2y}$— where y is 1 to 20. The number of repeating units in the polyimide can be, for example, 10 to 1,000, specifically 10 to 500.

Exemplary tetravalent linkers, U, include tetravalent aromatic radicals of the formula

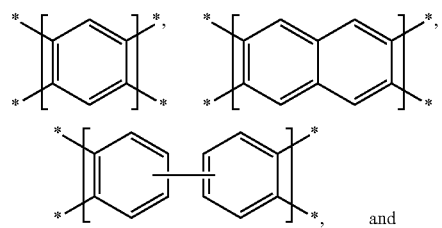

and

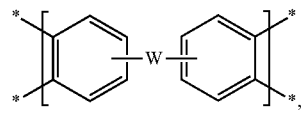

wherein W is a divalent moiety such as —O—, —S—, —C(O)—, —SO$_2$—, —SO—, —C$_y$H$_{2y}$— (y being an integer of 1 to 20), and halogenated derivatives thereof, including perfluoroalkylene groups, or a group of the Formula —O—Z—O— wherein the divalent bonds of the —O— or the —O—Z—O— group are in the 3,3', 3,4', 4,3', or the 4,4' positions, and wherein Z includes divalent moieties of the formula

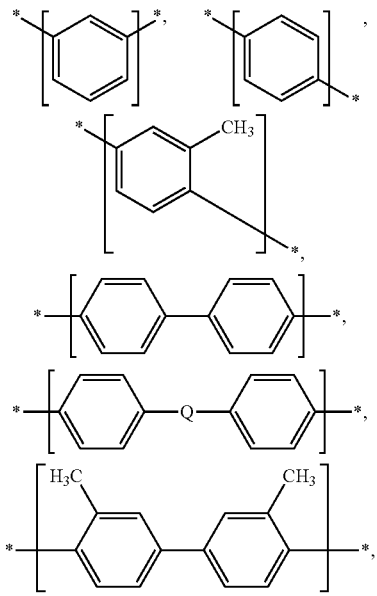

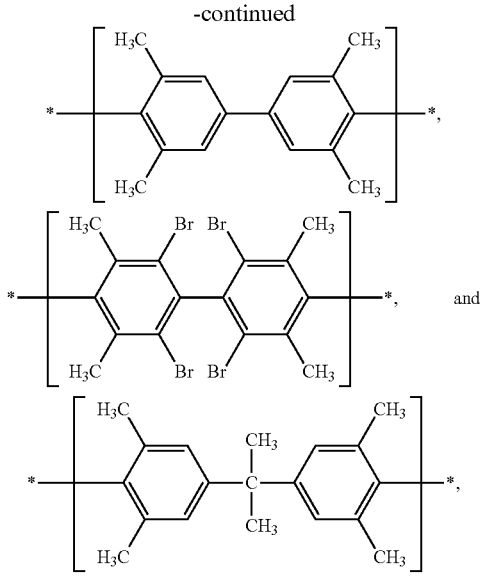

wherein Q is divalent moiety that can be —O—, —S—, —C(O)—, —SO$_2$—, —SO—, —C$_y$H$_2$— wherein y is 1 to 8, or —C$_p$H$_q$F$_r$— where p is from 1 to 8 and q is 0 to 15 and r is 1 to 16 and q+r=2p. In some embodiments the tetravalent linker U is free of halogens.

In some embodiments, the polyimide comprises a polyetherimide. Polyetherimides comprise repeating units of formula

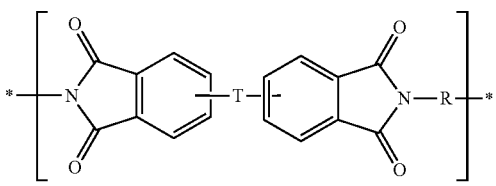

wherein T is —O— or a group of the Formula —O—Z—O— wherein the divalent bonds of the —O— or the —O—Z—O— group are in the 3,3', 3,4', 4,3', or the 4,4' positions of the phthalimide groups, and wherein Z and R$^1$ are defined as described above. In some embodiments, each occurrence of R$^1$ is independently p-phenylene or m-phenylene, and T is a divalent moiety of the formula

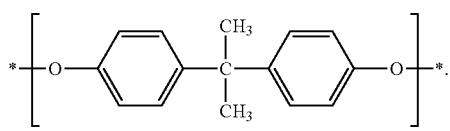

Included among the many methods of making polyimides, including polyetherimides, are those disclosed in U.S. Pat. Nos. 3,847,867 to Heath et al., 3,850,885 to Takekoshi et al., 3,852,242 and 3,855,178 to White, 3,983,093 to Williams et al., and 4,443,591 to Schmidt et al.

In some embodiments, the polyimide comprises a polyetherimide comprising 10 to 1000 repeating units having the structure

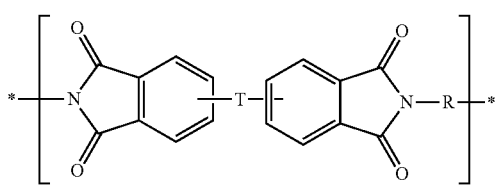

wherein T is —O— or a group of the formula —O—Z—O— wherein the divalent bonds of the —O— or the —O—Z—O— group are in the 3,3', 3,4', 4,3', or the 4,4' positions, and wherein Z is selected from the group consisting of

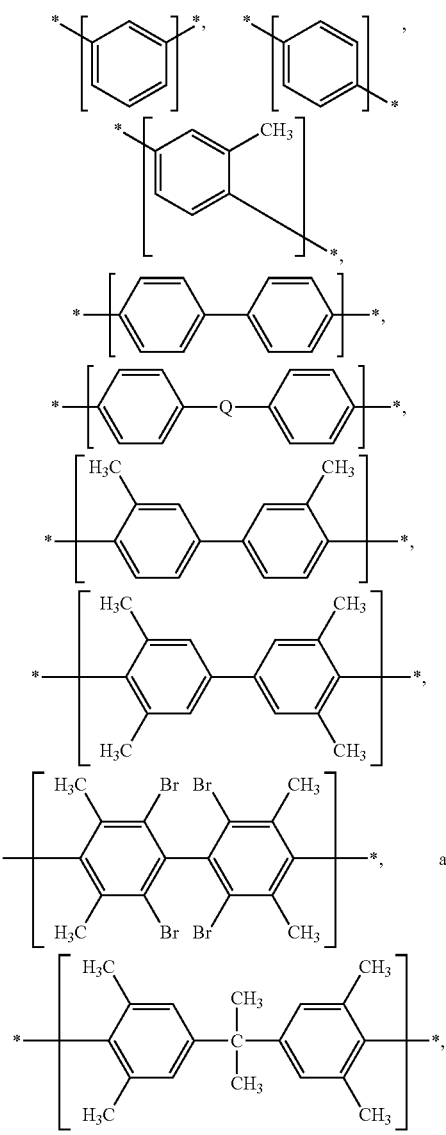

wherein Q is divalent moiety selected from the group consisting of —O—, —S—, —C(O)—, —SO$_2$—, —SO—, —C$_y$H$_2$— where y is 1 to 8, and —C$_p$H$_q$F$_r$— where p is from 1 to 8, q is 0 to 15, r is 1 to 16, and q+r=2p.

In some embodiments, R$^1$ is independently at each occurrence meta-phenylene or para-phenylene, and U has the structure

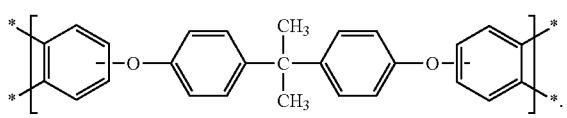

The repeating units of the polyimide are formed by the reaction of a dianhydride and a diamine. Dianhydrides useful for forming the repeating units include those having the formula

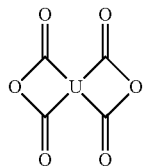

wherein U is as defined above. As mentioned above the term dianhydrides includes chemical equivalents of dianhydrides. In some embodiments, the dianhydride comprises an aromatic bis(ether anhydride). Examples of specific aromatic bis(ether anhydride)s are disclosed, for example, in U.S. Pat. Nos. 3,972,902 to Heath et al. and 4,455,410 to Giles. Illustrative examples of aromatic bis(ether anhydride)s include 2,2-bis[4-(3,4-dicarboxyphenoxy)phenyl]propane dianhydride, 4,4'-bis(3,4-dicarboxyphenoxy)diphenyl ether dianhydride, 4,4'-bis(3,4-dicarboxyphenoxy)diphenyl sulfide dianhydride, 4,4'-bis(3,4-dicarboxyphenoxy)benzophenone dianhydride, 4,4'-bis(3,4-dicarboxyphenoxy)diphenyl sulfone dianhydride, 2,2-bis[4-(2,3-dicarboxyphenoxy)phenyl]propane dianhydride, 4,4'-bis(2,3-dicarboxyphenoxy)diphenyl ether dianhydride, 4,4'-bis(2,3-dicarboxyphenoxy) diphenyl sulfide dianhydride, 4,4'-bis(2,3-dicarboxyphenoxy)benzophenone dianhydride, 4,4'-bis(2,3-dicarboxyphenoxy)diphenyl sulfone dianhydride, 4-(2,3-dicarboxyphenoxy)-4'-(3,4-dicarboxyphenoxy)diphenyl-2, 2-propane dianhydride, 4-(2,3-dicarboxyphenoxy)-4'-(3,4-dicarboxyphenoxy)diphenyl ether dianhydride, 4-(2,3-dicarboxyphenoxy)-4'-(3,4-dicarboxyphenoxy)diphenyl sulfide dianhydride, 4-(2,3-dicarboxyphenoxy)-4'-(3,4-dicarboxyphenoxy)benzophenone dianhydride, 4-(2,3-dicarboxyphenoxy)-4'-(3,4-dicarboxyphenoxy)diphenyl sulfone dianhydride, and mixtures thereof.

Diamines useful for forming the repeating units of the polyimide include those having the formula $$H_2N-R^1-NH_2$$

wherein $R^1$ is as defined above. Examples of specific organic diamines are disclosed, for example, in U.S. Pat. Nos. 3,972, 902 to Heath et al. and 4,455,410 to Giles. Exemplary diamines include ethylenediamine, propylenediamine, trimethylenediamine, diethylenetriamine, triethylenetertramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy) ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylenediamine, 5-methyl-4,6-diethyl-1,3-phenylenediamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis (p-amino-t-butyl)toluene, bis(p-amino-t-butylphenyl)ether, bis(p-methyl-o-aminophenyl)benzene, bis(p-methyl-o-aminopentyl)benzene, 1,3-diamino-4-isopropylbenzene, bis(4-aminophenyl)sulfide, bis(4-aminophenyl)sulfone, bis(4-aminophenyl)ether, 1,3-bis(3-aminopropyl) tetramethyldisiloxane, and mixtures thereof. In some embodiments, the diamine is an aromatic diamine, more specifically, m-phenylenediamine, p-phenylenediamine, sulfonyl dianiline, or a mixture thereof.

In general, polyimide-forming reactions can be carried out employing various solvents, e.g., o-dichlorobenzene, m-cresol/toluene, and the like, to effect a reaction between the dianhydride and the diamine, at temperatures of 100° C. to 250° C. Alternatively, the polyimide block can be prepared by melt polymerization or interfacial polymerization, e.g., melt polymerization of an aromatic bis(anhydride) and a diamine by heating a mixture of the starting materials to elevated temperatures with concurrent stirring. Generally, melt polymerizations employ temperatures of 200° C. to 400° C.

A chain-terminating agent can be employed to control the molecular weight of the polyimide. Monofunctional amines such as aniline, or monofunctional anhydrides such as phthalic anhydride can be employed.

In some embodiments, the polyimide has a melt index of 0.1 to 10 grams per minute, determined according to ASTM D 1238-04 at 350° C., using a 6.6 kilogram (kg) load. In some embodiments, the polyetherimide resin has a weight average molecular weight of 10,000 to 150,000 grams per mole, as determined by gel permeation chromatography using polystyrene standards. In some embodiments, the polyetherimide has a weight average molecular weight of 20,000 to 60,000. In some embodiments, the polyimide has an intrinsic viscosity greater than or equal to 0.2 deciliter per gram, specifically 0.35 to 0.7 deciliter per gram, measured by Ubbelohde viscometer in m-cresol at 25° C.

The polyimide is used in an amount of 5 to 30 weight percent, based on the total weight of the composition. Within this range, the polyimide amount can be 10 to 25 weight percent, specifically 10 to 20 weight percent, more specifically 10 to 15 weight percent.

In addition to the polyamide, the acid-functionalized poly (phenylene ether), and the polyimide, the components melt blended to form the composition include a metal dialkylphosphinate. As used herein, the term "metal dialkylphosphinate" refers to a salt comprising at least one metal cation and at least one dialkylphosphinate anion. In some embodiments, the metal dialkylphosphinate has the formula

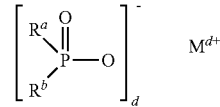

wherein $R^a$ and $R^b$ are each independently $C_1$-$C_6$ alkyl; M is calcium, magnesium, aluminum, or zinc; and d is 2 or 3. Examples of $R^a$ and $R^b$ include methyl, ethyl, n-propyl, isopropyl, n-butyl, tert-butyl and n-pentyl. In some embodiments, $R^a$ and $R^b$ are ethyl, M is aluminum, and d is 3 (that is, the metal dialkylphosphinate is aluminum tris(diethylphosphinate).

In some embodiments, the metal dialkylphosphinate is in particulate form. The metal dialkylphosphinate particles can have a median particle diameter (D50) less than or equal to 40 micrometers, specifically a D50 less than or equal to 30 micrometers, more specifically a D50 less than or equal to 25 micrometers. Additionally, the metal dialkylphosphinate can be combined with a polymer, such as a portion of the polyamide or a portion of the poly(phenylene ether)-polysiloxane block copolymer reaction product, to form a masterbatch. The metal dialkylphosphinate masterbatch comprises the metal dialkylphosphinate in an amount greater than is present in the composition as a whole. Employing a masterbatch for the addition of the metal dialkylphosphinate to the other components of the composition can facilitate addition and improve distribution of the metal dialkylphosphinate.

The composition comprises an amount of metal dialkylphosphinate effective to provide a flammability rating of V-1 or V-0 in the 20 mm Vertical Burning Flame Test of Underwriter's Laboratory Bulletin 94 "Tests for Flammability of Plastic Materials, UL 94". The specific amount of metal dialkylphosphinate can be determined by a person skilled in the art and depends on factors including the type of acid-functionalized poly(phenylene ether). For example, when the acid-functionalized poly(phenylene ether) is an acid-functionalized homopolymer or copolymer of monomers selected from the group consisting of 2,6-dimethylphenol, 2,3,6-trimethylphenol, and combinations thereof, then the amount of metal dialkylphosphinate can be 4 to 15 weight percent, specifically 4 to 10 weight percent, more specifically 4 to 8 weight percent, even more specifically 4 to 6 weight percent, based on the total weight of the composition. Alternatively, when the acid-functionalized poly(phenylene ether) comprises an acid-functionalized poly(phenylene ether)-polysiloxane block copolymer, then the amount of metal dialkylphosphinate can be 2 to 15 weight, specifically 3 to 10 weight percent, more specifically 4 to 8 weight percent, even more specifically 4 to 6 weight percent, based on the total weight of the composition.

The composition can, optionally, include flame retardants in addition to the metal dialkylphosphinate. Such additional flame retardants can include, for example, organophosphate esters (such as resorcinol bis(diphenyl phosphate) and bisphenol A bis(diphenyl phosphate), nitrogen-containing flame retardants (such as melamine cyanurate, melamine phosphate, melamine pyrophosphate, and melamine polyphosphate), metal hydroxides (such as magnesium hydroxide), and combinations thereof. In some embodiments, the flame retardant consists of the metal dialkylphosphinate.

The composition can, optionally, further comprise glass fibers. For example, in some embodiments the composition comprises 2 to 20 weight percent glass fibers. In other embodiments, the composition comprises less than 2 weight percent glass fibers, specifically less than 1 weight percent glass fibers, more specifically no glass fibers.

The composition can, optionally, further comprise one or more additives known in the thermoplastics art. For example, the composition can, optionally, further comprise an additive chosen from stabilizers, mold release agents, lubricants, processing aids, drip retardants, nucleating agents, UV blockers, dyes, pigments, antioxidants, anti-static agents, blowing agents, mineral oil, metal deactivators, antiblocking agents, and the like, and combinations thereof. When present, such additives are typically used in a total amount of less than or equal to 5 weight percent, specifically less than or equal to 2 weight percent, more specifically less than or equal to 1 weight percent, based on the total weight of the composition.

The composition can, optionally, exclude one or more of homopolystyrenes, rubber-modified polystyrenes, polyesters, polyolefins, block copolymers of alkenyl aromatic monomers and conjugated dienes, and hydrogenated block copolymers of alkenyl aromatic monomers and conjugated dienes. In some embodiments, the composition excludes any polymer other than the polyamide, the acid-functionalized poly(phenylene ether), and the poly(phenylene ether)-polysiloxane block copolymer. In some embodiments, the composition is halogen-free.

The composition can be used to mold rigid articles. In these embodiments, the composition must exhibit has a high degree of stiffness, objectively manifested as flexural modulus, that is greater than the stiffness provided by prior art composition intended for use in forming flexible insulation for wire and cable. Specifically, in these embodiments the composition exhibits a flexural modulus of 1800 to 2500 megapascals, measured at 23° C. according to ISO 178:2010.

In a very specific embodiment of the composition, the polyamide comprises polyamide-6,6; the polyamide amount is 42 to 50 weight percent; the acid-functionalized poly(phenylene ether) is the product of melt blending 96 to 99 parts by weight of a poly(phenylene ether) with 1 to 4 parts by weight of a functionalizing agent selected from the group consisting of citric acid, fumaric acid, maleic acid, maleic anhydride, and combinations thereof; the poly(phenylene ether) comprises a homopolymer or copolymer of monomers selected from the group consisting of 2,6-dimethylphenol, 2,3,6-trimethylphenol, and combinations thereof; the acid-functionalized poly(phenylene ether) amount is 30 to 48 weight percent; the polyimide comprises a polyetherimide comprising 10 to 1000 repeating units having the structure

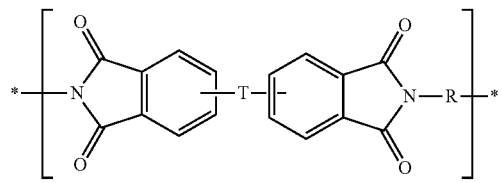

wherein T is —O— or a group of the formula —O—Z—O— wherein the divalent bonds of the —O— or the —O—Z—O— group are in the 3,3', 3,4', 4,3', or the 4,4' positions, and wherein Z is selected from the group consisting of

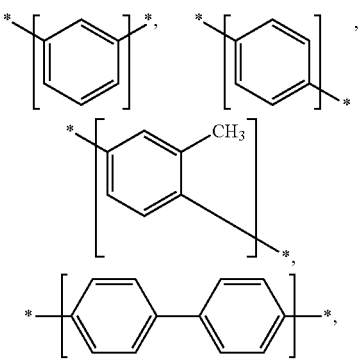

-continued

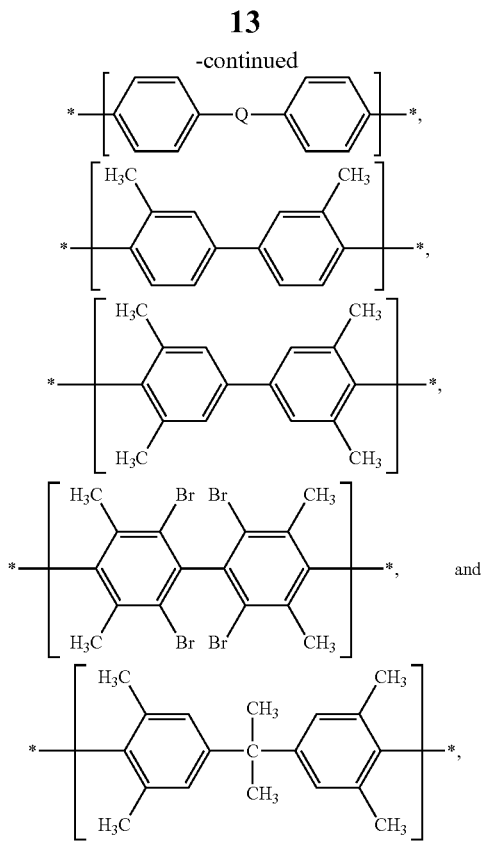

wherein Q is divalent moiety selected from the group consisting of —O—, —S—, —C(O)—, —SO$_2$—, —SO—, —C$_y$H$_2$— where y is 1 to 8, and —C$_p$H$_q$F$_r$— where p is from 1 to 8, q is 0 to 15, r is 1 to 16, and q+r=2p; the polyimide amount is 5 to 15 weight percent; the metal dialkylphosphinate comprises aluminum tris(diethylphosphinate); and the metal dialkyphosphinate amount is 4 to 10 weight percent.

In another very specific embodiment of the composition, the polyamide comprises polyamide-6,6; the polyamide amount is 42 to 50 weight percent; the acid-functionalized poly(phenylene ether) is the product of melt blending 96 to 99 parts by weight of a poly(phenylene ether) with 1 to 4 parts by weight of a functionalizing agent selected from the group consisting of citric acid, fumaric acid, maleic acid, maleic anhydride, and combinations thereof; the poly(phenylene ether) comprises a poly(phenylene ether)-polysiloxane block copolymer; the poly(phenylene ether)-polysiloxane block copolymer contributes 0.8 to 3 weight percent of polysiloxane blocks to the composition; the acid-functionalized poly (phenylene ether) amount is 30 to 48 weight percent; the polyimide comprises a polyetherimide comprising 10 to 1000 repeating units having the structure

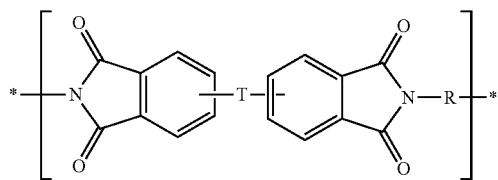

wherein T is —O— or a group of the formula —O—Z—O— wherein the divalent bonds of the —O— or the —O—Z—O— group are in the 3,3', 3,4', 4,3', or the 4,4' positions, and wherein Z is selected from the group consisting of

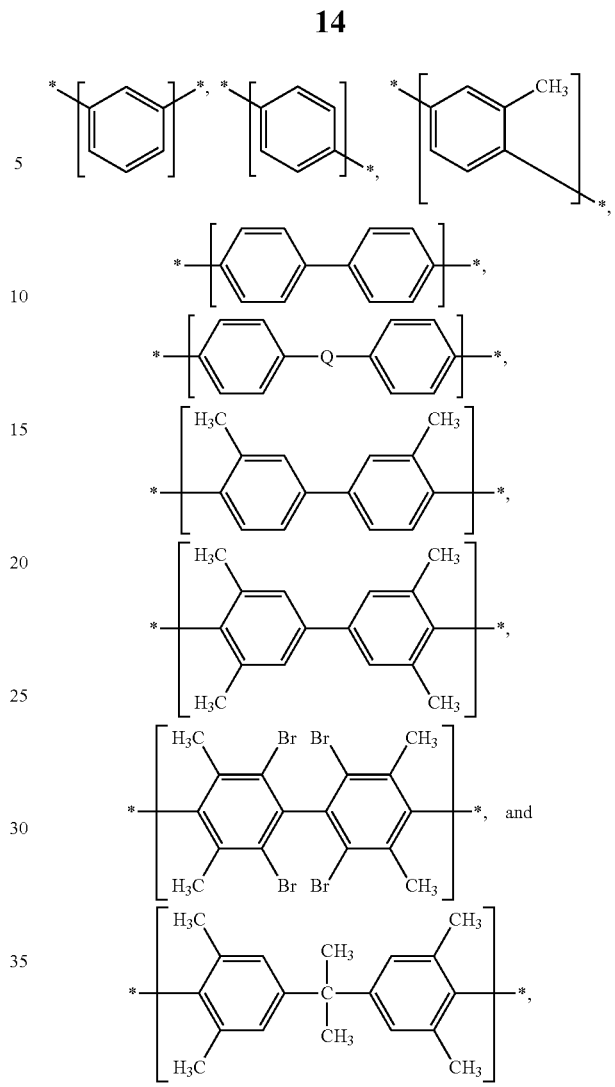

wherein Q is divalent moiety selected from the group consisting of —O—, —S—, —C(O)—, —SO$_2$—, —SO—, —C$_y$H$_2$— where y is 1 to 8, and —C$_p$H$_q$F$_r$— where p is from 1 to 8, q is 0 to 15, r is 1 to 16, and q+r=2p; the polyimide amount is 5 to 15 weight percent; the metal dialkylphosphinate comprises aluminum tris(diethylphosphinate); and the metal dialkyphosphinate amount is 3 to 10 weight percent.

The invention includes articles comprising the composition and all of its variations. The composition is particularly useful for forming parts for electrical components, such parts including photovoltaic junction boxes and connectors, inverter housings, automotive electrical connectors, electrical relays, charge couplers, and seats in mass transit vehicles. Suitable methods of forming articles include single layer and multilayer sheet extrusion, injection molding, blow molding, film extrusion, profile extrusion, pultrusion, compression molding, thermoforming, pressure forming, hydroforming, vacuum forming, and the like. Combinations of the foregoing article fabrication methods can be used. A skilled person can determine specific article-forming conditions. For example, injection molding can utilize a melt temperature of 240 to 300° C. and a mold temperature of 60 to 120° C. One embodiment is an article comprising a composition comprising the product of melt blending: 40 to 70 weight percent polyamide; 20 to 50 weight percent acid-functionalized poly(phenylene ether); 5 to 30 weight percent polyimide; and an amount of metal dialkylphosphinate effective to provide a flammability rating of V-1 or V-0 in the 20 mm Vertical Burning Flame Test of Underwriter's Laboratory Bulletin 94 "Tests for Flammability of Plastic Materials, UL 94"; wherein all weight percents are based on the total weight of the composition.

In some embodiments of the article, the polyamide comprises polyamide-6,6; the polyamide amount is 42 to 50 weight percent; the acid-functionalized poly(phenylene ether) is the product of melt blending 96 to 99 parts by weight of a poly(phenylene ether) with 1 to 4 parts by weight of a functionalizing agent selected from the group consisting of citric acid, fumaric acid, maleic acid, maleic anhydride, and combinations thereof; the poly(phenylene ether) comprises a homopolymer or copolymer of monomers selected from the group consisting of 2,6-dimethylphenol, 2,3,6-trimethylphenol, and combinations thereof; the acid-functionalized poly(phenylene ether) amount is 30 to 48 weight percent; the polyimide comprises a polyetherimide comprising 10 to 1000 repeating units having the structure

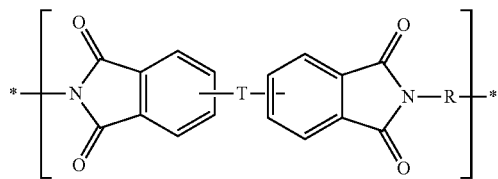

wherein T is —O— or a group of the formula —O—Z—O— wherein the divalent bonds of the —O— or the —O—Z—O— group are in the 3,3', 3,4', 4,3', or the 4,4' positions, and wherein Z is selected from the group consisting of

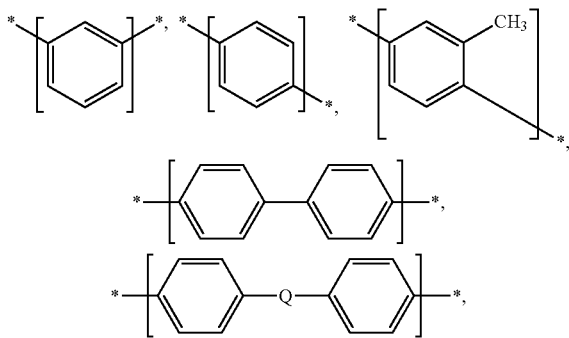

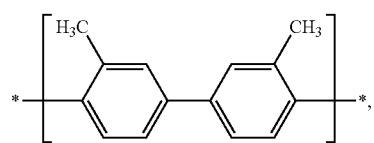

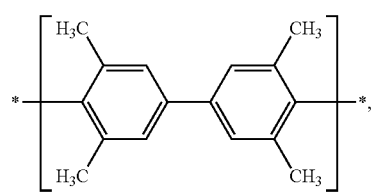

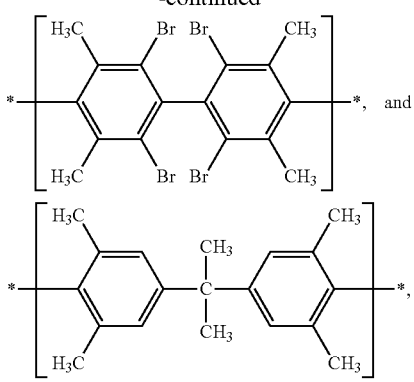

wherein Q is divalent moiety selected from the group consisting of —O—, —S—, —C(O)—, —SO$_2$—, —SO—, —C$_y$H$_2$— where y is 1 to 8, and —C$_p$H$_q$F$_r$— where p is from 1 to 8, q is 0 to 15, r is 1 to 16, and q+r=2p; the polyimide amount is 5 to 15 weight percent; the metal dialkylphosphinate comprises aluminum tris(diethylphosphinate); and the metal dialkyphosphinate amount is 4 to 10 weight percent.

In some embodiments of the article, the polyamide comprises polyamide-6,6; the polyamide amount is 42 to 50 weight percent; the acid-functionalized poly(phenylene ether) is the product of melt blending 96 to 99 parts by weight of a poly(phenylene ether) with 1 to 4 parts by weight of a functionalizing agent selected from the group consisting of citric acid, fumaric acid, maleic acid, maleic anhydride, and combinations thereof; the poly(phenylene ether) comprises a poly(phenylene ether)-polysiloxane block copolymer; the poly(phenylene ether)-polysiloxane block copolymer contributes 0.8 to 3 weight percent of polysiloxane blocks to the composition; the acid-functionalized poly(phenylene ether) amount is 30 to 48 weight percent; the polyimide comprises a polyetherimide comprising 10 to 1000 repeating units having the structure

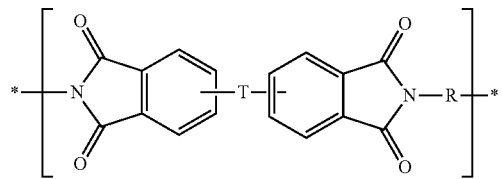

wherein T is —O— or a group of the formula —O—Z—O— wherein the divalent bonds of the —O— or the —O—Z—O— group are in the 3,3', 3,4', 4,3', or the 4,4' positions, and wherein Z is selected from the group consisting of

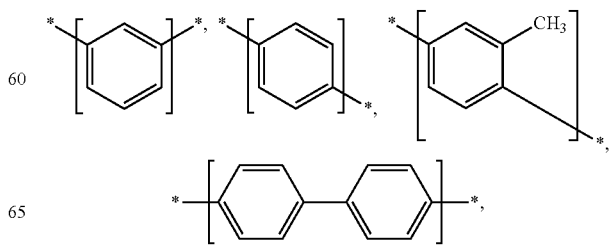

-continued

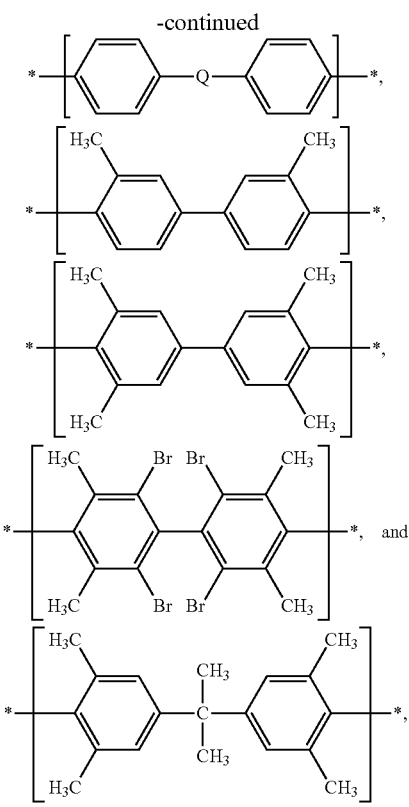

wherein Q is divalent moiety selected from the group consisting of —O—, —S—, —C(O)—, —SO$_2$—, —SO—, —C$_y$H$_2$— where y is 1 to 8, and —C$_p$H$_q$F$_r$— where p is from 1 to 8, q is 0 to 15, r is 1 to 16, and q+r=2p; the polyimide amount is 5 to 15 weight percent; the metal dialkylphosphinate comprises aluminum tris(diethylphosphinate); and the metal dialkyphosphinate amount is 3 to 10 weight percent.

The invention includes at least the following embodiments.

Embodiment 1

A composition comprising the product of melt blending: 40 to 70 weight percent polyamide; 20 to 50 weight percent acid-functionalized poly(phenylene ether); 5 to 30 weight percent polyimide; and an amount of metal dialkylphosphinate effective to provide a flammability rating of V-1 or V-0 in the 20 mm Vertical Burning Flame Test of Underwriter's Laboratory Bulletin 94 "Tests for Flammability of Plastic Materials, UL 94"; wherein all weight percents are based on the total weight of the composition.

Embodiment 2

The composition of embodiment 1, wherein the polyamide is selected from the group consisting of polyamide-6, polyamide-6,6, polyamide-4,6, polyamide-11, polyamide-12, polyamide-6,10, polyamide-6,12, polyamide 6/6,6, polyamide-6/6,12, polyamide MXD,6, polyamide-6,T, polyamide-6,I, polyamide-6/6,T, polyamide-6/6,I, polyamide-6,6/6,T, polyamide-6,6/6,I, polyamide-6/6,T/6,I, polyamide-6,6/6,T/ 6,I, polyamide-6/12/6,T, polyamide-6,6/12/6,T, polyamide-6/12/6,I, polyamide-6,6/12/6,I, and combinations thereof.

Embodiment 3

The composition of embodiment 1, wherein the polyamide is selected from the group consisting of polyamide-6, polyamide-6,6, and combinations thereof.

Embodiment 4

The composition of embodiment 1, wherein the polyamide comprises polyamide-6,6.

Embodiment 5

The composition of any of embodiments 1-4, wherein the acid-functionalized poly(phenylene ether) is the product of melt blending 95 to 99.5 parts by weight of a poly(phenylene ether) with 0.5 to 5 parts by weight of a functionalizing agent selected from the group consisting of citric acid, fumaric acid, maleic acid, maleic anhydride, and combinations thereof.

Embodiment 6

The composition of embodiment 5, wherein the poly(phenylene ether) comprises a homopolymer or copolymer of monomers selected from the group consisting of 2,6-dimethylphenol, 2,3,6-trimethylphenol, and combinations thereof.

Embodiment 7

The composition of embodiment 6, comprising 4 to 15 weight percent of the metal dialkylphosphinate.

Embodiment 8

The composition of embodiment 5, wherein the poly(phenylene ether) comprises a poly(phenylene ether)-polysiloxane block copolymer.

Embodiment 9

The composition of embodiment 8, comprising 2 to 15 weight percent of the metal dialkylphosphinate.

Embodiment 10

The composition of embodiment 8 or 9, wherein the poly(phenylene ether)-polysiloxane block copolymer contributes 0.4 to 4 weight percent of polysiloxane blocks to the composition.

Embodiment 11

The composition of any of embodiments 1-10, wherein the polyimide comprises a polyetherimide comprising 10 to 1000 repeating units having the structure

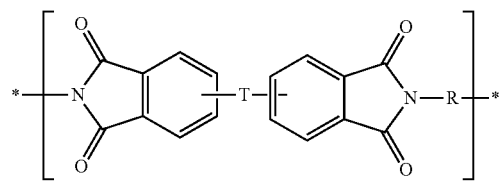

wherein T is —O— or a group of the formula —O—Z—O— wherein the divalent bonds of the —O— or the —O—Z—

O— group are in the 3,3', 3,4', 4,3', or the 4,4' positions, and wherein Z is selected from the group consisting of

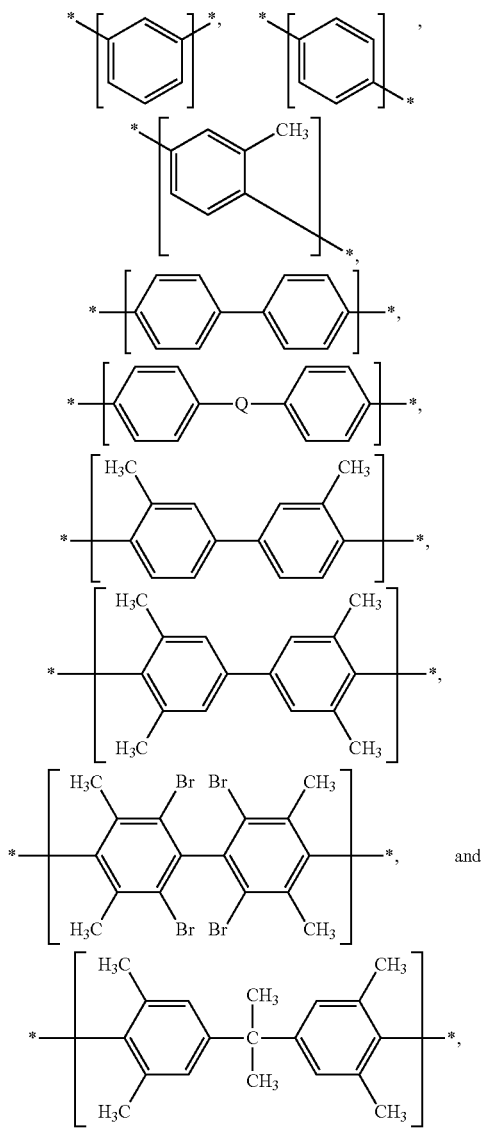

and wherein Q is divalent moiety selected from the group consisting of —O—, —S—, —C(O)—, —SO$_2$—, —SO—, —C$_y$H$_2$— where y is 1 to 8, and —C$_p$H$_q$F$_r$— where p is from 1 to 8, q is 0 to 15, r is 1 to 16, and q+r=2p.

Embodiment 12

The composition of any of embodiments 1-11, further comprising 2 to 20 weight percent glass fibers.

Embodiment 13

The composition of any of embodiments 1-11, comprising less than 2 weight percent glass fibers.

Embodiment 14

The composition of embodiment 1, wherein the polyamide comprises polyamide-6,6; wherein the polyamide amount is 42 to 50 weight percent; wherein the acid-functionalized poly(phenylene ether) is the product of melt blending 96 to 99 parts by weight of a poly(phenylene ether) with 1 to 4 parts by weight of a functionalizing agent selected from the group consisting of citric acid, fumaric acid, maleic acid, maleic anhydride, and combinations thereof; wherein the poly(phenylene ether) comprises a homopolymer or copolymer of monomers selected from the group consisting of 2,6-dimethylphenol, 2,3,6-trimethylphenol, and combinations thereof; wherein the acid-functionalized poly(phenylene ether) amount is 30 to 48 weight percent; wherein the polyimide comprises a polyetherimide comprising 10 to 1000 repeating units having the structure

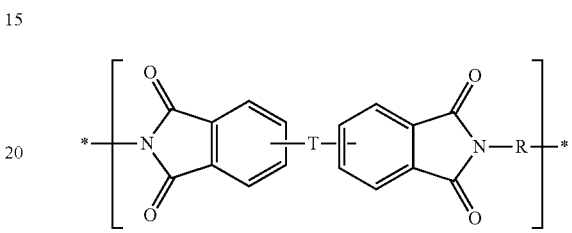

wherein T is —O— or a group of the formula —O—Z—O— wherein the divalent bonds of the —O— or the —O—Z—O— group are in the 3,3',3,4',4,3', or the 4,4' positions, and wherein Z is selected from the group consisting of

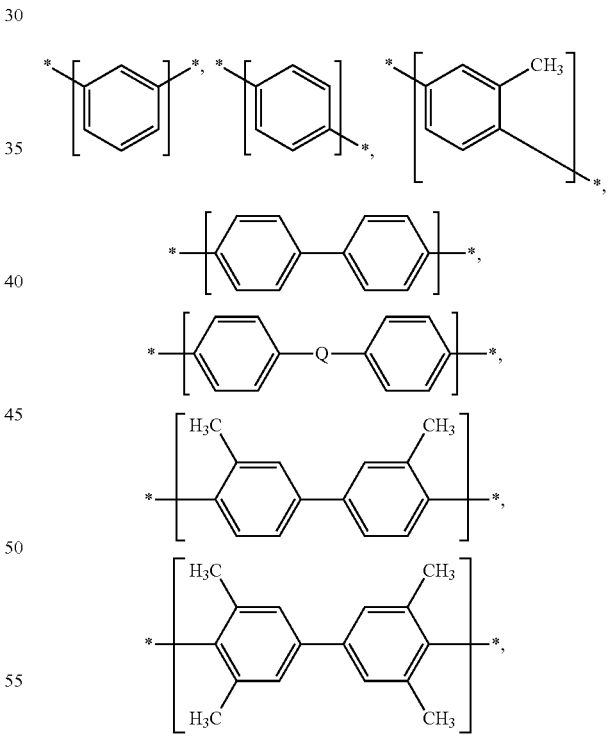

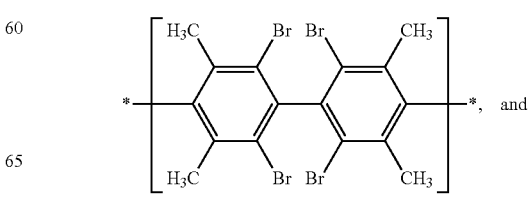

and

-continued

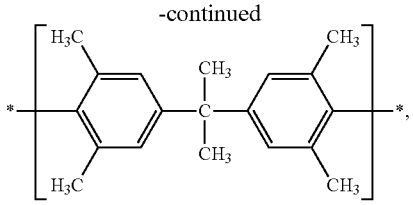

wherein Q is divalent moiety selected from the group consisting of —O—, —S—, —C(O)—, —SO$_2$—, —SO—, —C$_y$H$_2$— where y is 1 to 8, and —C$_p$H$_q$F$_r$— where p is from 1 to 8, q is 0 to 15, r is 1 to 16, and q+r=2p; wherein the polyimide amount is 5 to 15 weight percent; wherein the metal dialkylphosphinate comprises aluminum tris(diethylphosphinate); and wherein the metal dialkyphosphinate amount is 4 to 10 weight percent.

Embodiment 15

The composition of embodiment 1, wherein the polyamide comprises polyamide-6,6; wherein the polyamide amount is 42 to 50 weight percent; wherein the acid-functionalized poly(phenylene ether) is the product of melt blending 96 to 99 parts by weight of a poly(phenylene ether) with 1 to 4 parts by weight of a functionalizing agent selected from the group consisting of citric acid, fumaric acid, maleic acid, maleic anhydride, and combinations thereof; wherein the poly(phenylene ether) comprises a poly(phenylene ether)-polysiloxane block copolymer; wherein the poly(phenylene ether)-polysiloxane block copolymer contributes 0.8 to 3 weight percent of polysiloxane blocks to the composition; wherein the acid-functionalized poly(phenylene ether) amount is 30 to 48 weight percent; wherein the polyimide comprises a polyetherimide comprising 10 to 1000 repeating units having the structure

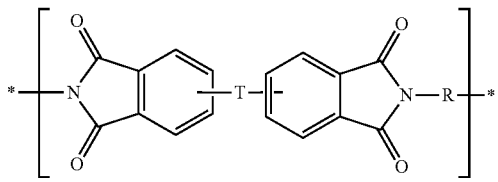

wherein T is —O— or a group of the formula —O—Z—O— wherein the divalent bonds of the —O— or the —O—Z—O— group are in the 3,3', 3,4', 4,3', or the 4,4' positions, and wherein Z is selected from the group consisting of

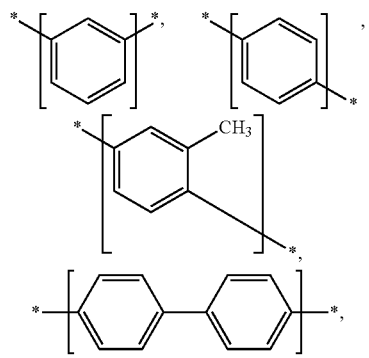

-continued

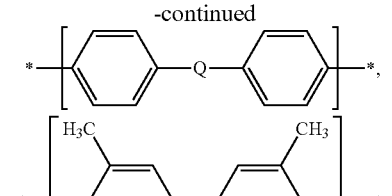

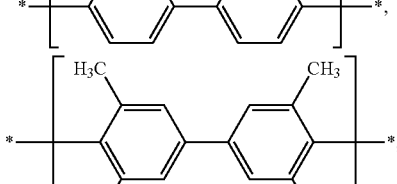

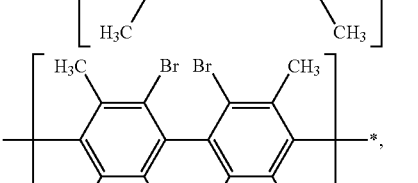

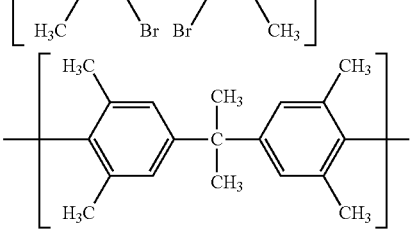, and wherein Q is divalent moiety selected from the group consisting of —O—, —S—, —C(O)—, —SO$_2$—, —SO—, —C$_y$H$_2$— where y is 1 to 8, and —C$_p$R$_q$F$_r$— where p is from 1 to 8, q is 0 to 15, r is 1 to 16, and q+r=2p; wherein the polyimide amount is 5 to 15 weight percent; wherein the metal dialkylphosphinate comprises aluminum tris(diethylphosphinate); and wherein the metal dialkyphosphinate amount is 3 to 10 weight percent.

Embodiment 16

An article comprising a composition comprising the product of melt blending: 40 to 70 weight percent polyamide; 20 to 50 weight percent acid-functionalized poly(phenylene ether); 5 to 30 weight percent polyimide; and an amount of metal dialkylphosphinate effective to provide a flammability rating of V-1 or V-0 in the 20 mm Vertical Burning Flame Test of Underwriter's Laboratory Bulletin 94 "Tests for Flammability of Plastic Materials, UL 94"; wherein all weight percents are based on the total weight of the composition.

Embodiment 17

The article of embodiment 16, wherein the polyamide comprises polyamide-6,6; wherein the polyamide amount is 42 to 50 weight percent; wherein the acid-functionalized poly(phenylene ether) is the product of melt blending 96 to 99 parts by weight of a poly(phenylene ether) with 1 to 4 parts by weight of a functionalizing agent selected from the group consisting of citric acid, fumaric acid, maleic acid, maleic anhydride, and combinations thereof; wherein the poly(phenylene ether) comprises a homopolymer or copolymer of monomers selected from the group consisting of 2,6-dimethylphenol, 2,3,6-trimethylphenol, and combinations thereof; wherein the acid-functionalized poly(phenylene ether)

amount is 30 to 48 weight percent; wherein the polyimide comprises a polyetherimide comprising 10 to 1000 repeating units having the structure

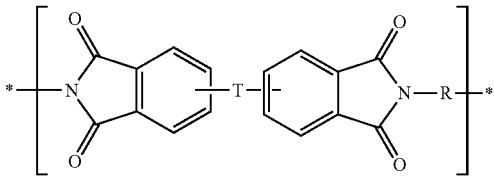

wherein T is —O— or a group of the formula —O—Z—O— wherein the divalent bonds of the —O— or the —O—Z—O— group are in the 3,3', 3,4', 4,3', or the 4,4' positions, and wherein Z is selected from the group consisting of

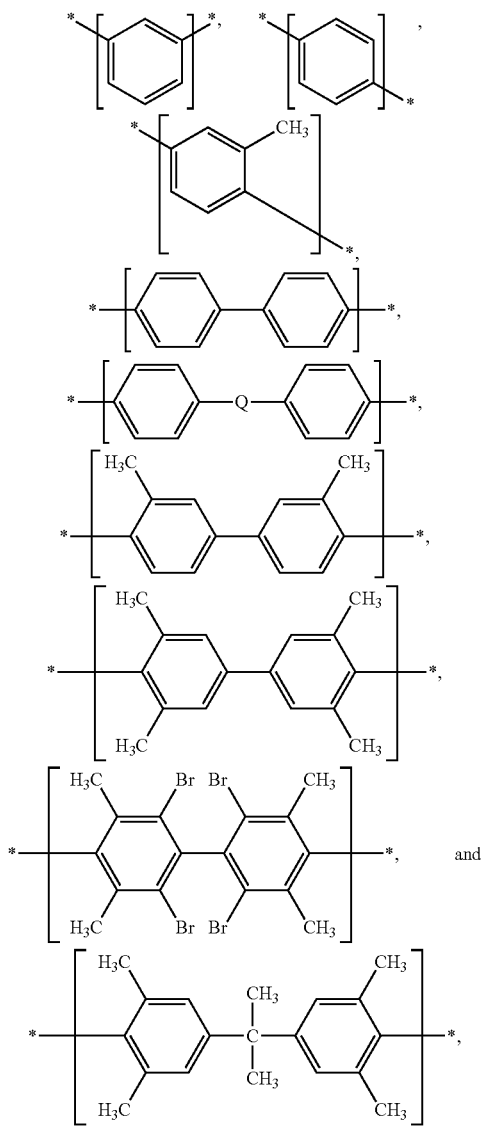

wherein Q is divalent moiety selected from the group consisting of —O—, —S—, —C(O)—, —SO$_2$—, —SO—, —C$_y$H$_2$— where y is 1 to 8, and —C$_p$R$_q$F$_r$— where p is from 1 to 8, q is 0 to 15, r is 1 to 16, and q+r=2p; wherein the polyimide amount is 5 to 15 weight percent; wherein the metal dialkylphosphinate comprises aluminum tris(diethylphosphinate); and wherein the metal dialkyphosphinate amount is 4 to 10 weight percent.

Embodiment 18

The article of embodiment 16, wherein the polyamide comprises polyamide-6,6; wherein the polyamide amount is 42 to 50 weight percent; wherein the acid-functionalized poly(phenylene ether) is the product of melt blending 96 to 99 parts by weight of a poly(phenylene ether) with 1 to 4 parts by weight of a functionalizing agent selected from the group consisting of citric acid, fumaric acid, maleic acid, maleic anhydride, and combinations thereof; wherein the poly(phenylene ether) comprises a poly(phenylene ether)-polysiloxane block copolymer; wherein the poly(phenylene ether)-polysiloxane block copolymer contributes 0.8 to 3 weight percent of polysiloxane blocks to the composition; wherein the acid-functionalized poly(phenylene ether) amount is 30 to 48 weight percent; wherein the polyimide comprises a polyetherimide comprising 10 to 1000 repeating units having the structure

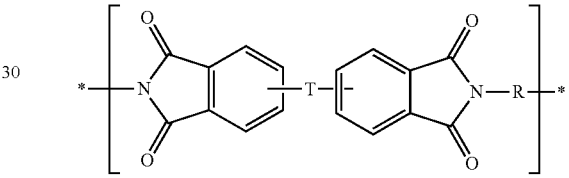

wherein T is —O— or a group of the formula —O—Z—O— wherein the divalent bonds of the —O— or the —O—Z—O— group are in the 3,3', 3,4', 4,3', or the 4,4' positions, and wherein Z is selected from the group consisting of

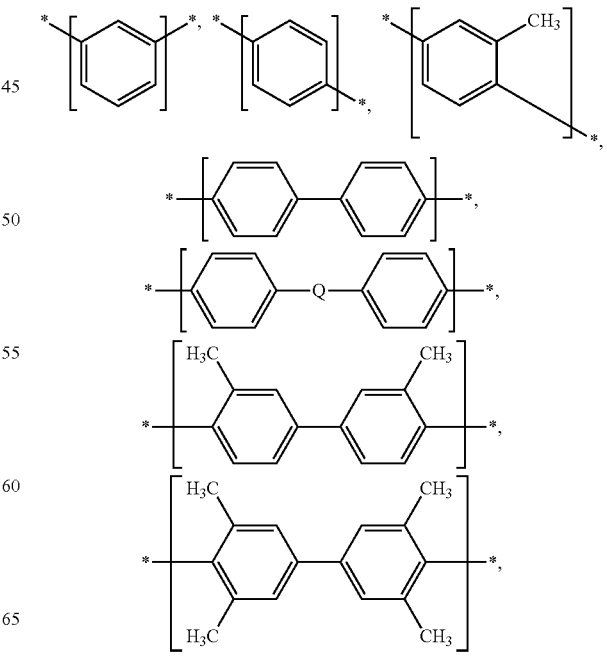

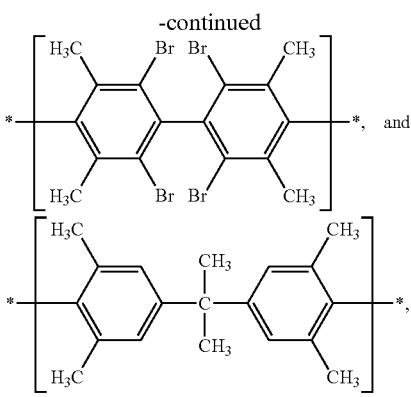

wherein Q is divalent moiety selected from the group consisting of —O—, —S—, —C(O)—, —SO$_2$—, —SO—, —C$_y$H$_2$— where y is 1 to 8, and —C$_p$H$_q$F$_r$— where p is from 1 to 8, q is 0 to 15, r is 1 to 16, and q+r=2p; wherein the polyimide amount is 5 to 15 weight percent; wherein the metal dialkylphosphinate comprises aluminum tris(diethylphosphinate); and wherein the metal dialkyphosphinate amount is 3 to 10 weight percent.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

Examples 1-10, Comparative Examples 1-6

These examples illustrate the improved property balance exhibited by the inventive composition.

Components used to form the compositions are summarized in Table 1.

TABLE 1

| Component | Description |
| --- | --- |
| PPE | Poly(2,6-dimethyl-1,4-phenylene ether), CAS Reg. No. 24938-67-8, having an intrinsic viscosity of about 0.4 deciliter per gram as measured in chloroform at 25° C.; obtained as PPO 803 from SABIC Innovative Plastics. |
| FPPE | A fumaric acid functionalized PPE, prepared by melt blending 98 parts by weight PPE and 2 parts by weight fumaric acid in an extruder. |
| PPE-Si | A mixture of poly(2,6-dimethyl-1,4-phenylene ether) (CAS Reg. No. 24938-67-8) and poly(2,6-dimethyl-1,4-phenylene ether)-polydimethylsiloxane block copolymer (CAS Reg. No. 1202019-56-4), the mixture having a polysiloxane content of about 5 weight percent and an intrinsic viscosity of about 0.4 deciliter per gram as measured in chloroform at 25° C.; prepared according to the procedure of U.S. Pat. No. 8,017,697 to Carrillo et al., Example 16. |
| FPPE-Si | A fumaric acid functionalized PPE-Si, prepared by melt blending 98 parts by weight PPE-Si and 2 parts by weight fumaric acid in an extruder. |
| PA66 | Polyamide-6,6, CAS Reg. No. 32131-17-2, having a relative viscosity of about 126 measured in 90% formic acid according to ASTM D789, and an amine end group concentration of about 51 microequivalents per gram; obtained in pellet form as STABAMID 24FE1 from Rhodia. |
| PEI | Polyetherimide, CAS Reg. No. 61128-46-9; obtained as ULTEM 1010 from SABIC Innovative Plastics. |

TABLE 1-continued

| Component | Description |
| --- | --- |
| AO1 | Octadecyl 3,5-di-tert-butyl-4-hydroxyhydrocinnamate, CAS Reg. No. 2082-79-3; obtained as IRGANOX 1076 from BASF. |
| AO2 | N,N'-Hexamethylene bis[3-(3,5-di-t-butyl-4-hydroxyphenyl)propionamide]; obtained as IRGANOX 1098 from Ciba. |
| Fumaric acid | Fumaric acid, CAS Reg. No. 10-17-8. |
| DEPAL | Aluminum tris(diethylphosphinate), CAS Reg. No. 225789-38-8; obtained as EXOLIT OP1230 from Clariant. |

Component amounts used to form the compositions are summarized in Table 2, where amounts are expressed in weight percent based on the total weight of the composition. Compounding was conducted on a 28 millimeter internal diameter ZSK twin-screw extruder at a melt temperature of 240 to 300° C. and a throughput of 15 kilograms/hour. First, the functionalized poly(phenylene ether)s designated FPPE or FPPE-Si were prepared by compounding 98 weight percent PPE or PPE-Si, respectively, with 2 weight percent fumaric acid. Second, the resulting functionalized poly(phenylene ether), FPPE or FPPE-Si, was dry-blended with PEI and DEPAL, and the resulting dry-blended mixture was added to the feedthroat of the extruder, and polyamide was added downstream via a side feeder. The extrudate was pelletized, and pellets were conditioned for 5.5 hours at 120° C. under vacuum before use for melt viscosity testing or injection molding samples for physical property testing.

Property values are also summarized in Table 2. Melt viscosity testing was performed according to ISO 11443:2005, using a temperature of 300° C. and the multi-point method where melt viscosity at various shear rates was measured. In Table 2, melt viscosity values having units of Pascal-seconds were measured at a shear rate of 1,500 second$^{-1}$.

Melt volume-flow rate values, expressed in units of cubic centimeters per 10 minutes, were determined according to ISO 1133-2005 using Procedure B (displacement-measurement, automatic method), a test temperature of 300° C., an applied load of 5 kilograms, a capillary diameter of 2.0955 millimeters, a capillary length of 8.0 millimeters, a test specimen form of pellets, specimen conditioning for 5.5 hours at 120° C. before testing, and one run with five readings per composition.

For physical property testing, compositions were injection molded into test samples using an injection molding machine operating at a melt temperature of 270 to 285° C. and a mold temperature of 80 to 100° C. Test samples were conditioned for 48 hours at 23° C. before testing.

Tensile modulus values, expressed in units of megapascals, and tensile strain at break values, express in units of percent, were determined at 23° C. according to ISO 527-1:2012 using a Type 1A bar having dimensions of 80 millimeters by 10 millimeters by 4 millimeters, a gage length of 50 millimeters, a grip separation of 115 millimeters, a test speed of 1 millimeter/minute, and five samples per composition.

Izod unnotched impact strength values, expressed in units of kilojoules/meter$^2$, were determined at 23° C. according to ISO 180:2000 using a Type A radius and a notch angle of 45 degrees and an 8 millimeter depth of material under the notch for notched samples, a hammer energy of 2.75 joules, bar cross-sectional dimensions of 10 millimeters by 4 millimeters, and five samples per composition. Table 2 also lists the failure modes of the five samples tested: "P" refers to a failure mode of "partial break" (corresponding to ductile failure), and "C" refers to a failure mode of complete break (corresponding to brittle failure). When all five samples have a failure mode of "partial break", the composition necessarily has an unnotched Izod impact strength value of 137.39 kilojoules/meter$^2$.

Flexural modulus and flexural strength values, expressed in units of megapascals, were determined at 23° C. according to ISO 178:2010 using bar cross-sectional dimensions of 80 millimeters by 10 millimeters by 4 millimeters, a support span of 64 millimeters, and three specimens per composition.

Vicat softening temperature values, expressed in units of degrees Celsius, were determined according to ISO 306:2004 using Method B120, a needle penetration of 1 millimeter at reading, a pre-loading time of 5 minutes, and three specimens per composition.

Flame retardancy of injection molded flame bars was determined according to Underwriter's Laboratory Bulletin 94 "Tests for Flammability of Plastic Materials, UL 94", 20 mm Vertical Burning Flame Test. Before testing, flame bars with a thickness of 0.8 millimeters were conditioned at 23° C. and 50% relative humidity for at least 48 hours. In the UL 94 20 mm Vertical Burning Flame Test, a set of five flame bars is tested. For each bar, a flame is applied to the bar then removed, and the time required for the bar to self-extinguish (first afterflame time, t1) is noted. The flame is then reapplied and removed, and the time required for the bar to self-extinguish (second afterflame time, t2) and the post-flame glowing time (afterglow time, t3) are noted. To achieve a rating of V-0, the afterflame times t1 and t2 for each individual specimen must be less than or equal to 10 seconds; and the total afterflame time for all five specimens (t1 plus t2 for all five specimens) must be less than or equal to 50 seconds; and the second afterflame time plus the afterglow time for each individual specimen (t2+t3) must be less than or equal to 30 seconds; and no specimen can flame or glow up to the holding clamp; and the cotton indicator cannot be ignited by flaming particles or drops. To achieve a rating of V-1, the afterflame times t1 and t2 for each individual specimen must be less than or equal to 30 seconds; and the total afterflame time for all five specimens (t1 plus t2 for all five specimens) must be less than or equal to 250 seconds; and the second afterflame time plus the afterglow time for each individual specimen (t2+t3) must be less than or equal to 60 seconds; and no specimen can flame or glow up to the holding clamp; and the cotton indicator cannot be ignited by flaming particles or drops. To achieve a rating of V-2, the afterflame times t1 and t2 for each individual specimen must be less than or equal to 30 seconds; and the total afterflame time for all five specimens (t1 plus t2 for all five specimens) must be less than or equal to 250 seconds; and the second afterflame time plus the afterglow time for each individual specimen (t2+t3) must be less than or equal to 60 seconds; and no specimen can flame or glow up to the holding clamp; but the cotton indicator can be ignited by flaming particles or drops. Compositions not meeting the V-2 criteria are considered to have failed.

Comparative Tracking Index (CTI) values, express in units of volts, were conducted according to the International Electrotechnical Commission (IEC) standard IEC-60112, Third edition (1979) using test samples having a thickness of 3.2 millimeters and diameter of 10 centimeters, and five samples per composition. The reported value is the voltage that causes tracking after 50 drops of ammonium chloride solution have fallen on the material surface.

The property results in Table 2 show that all inventive examples exhibit improved flame retardancy relative to the corresponding comparative examples (e.g., Examples 1 and 2 exhibit V-0 ratings relative to the failure of Comparative Examples 1 and 2; Examples 3 and 4 exhibit V-0 ratings relative to the failure of Comparative Examples 3 and 4; Example 5 exhibits a V-1 rating and Examples 6 and 7 exhibit V-0 ratings relative to the failure of Comparative Example 5; and Example 8 exhibits a V-0 rating and Examples 9 and 10 exhibit V-0 ratings relative to the failure of Comparative Example 6). The inventive examples also exhibit substantial increases in tensile modulus relative to corresponding comparative examples (e.g., Examples 1 and 2 exhibit tensile modulus values of 2918 and 3080 megapascals, respectively, relative to Comparative Examples 1 and 2 with values of 2729 and 2771 megapascals; Examples 3 and 4 exhibit tensile modulus values of 2922 and 3108 megapascals, respectively, relative to Comparative Examples 1 and 2 with values of 2742 and 2833 megapascals, respectively; Examples 5-7 exhibit tensile modulus values of 2733, 2773, and 3003 megapascals, respectively, relative to Comparative Example 5 with a value of 2541 megapascals; and Examples 8-10 exhibit tensile modulus values of 2801, 2903, and 3087 megapascals, respectively, relative to Comparative Example 6 with a value of 2675 megapascals). For samples with FPPE, note that Examples 1 and 2, with relatively low PEI content and relatively high DEPAL content, preserve the high CTI value of 600 volts for corresponding Comparative Example 1 with no DEPAL, which is surprising given that a reduced CTI value of 500 volts was observed for Comparative Example 2 with relatively low DEPAL content. For the samples with FPPE-Si, CTI was uniformly improved for inventive examples relative to comparative examples (e.g., Examples 5-7 with CTI values of 300, 300, and 500 volts, respectively, relative to Comparative Example 5 with a value of 275 volts; and Examples 8-10 with CTI values of 300, 300, and 400 volts, respectively, relative to Comparative Example 6 with a value of 250 volts). Where comparisons are possible, melt viscosity was desirably reduced for inventive samples relative to corresponding comparative examples (e.g., Examples 1 and 2 exhibit melt viscosity values of 111 and 113 pascal-seconds, respectively, relative to values of 122 and 125 for Comparative Examples 1 and 2, respectively; Examples 3 and 4 exhibit melt viscosity values of 111 and 116 pascal-seconds, respectively, relative to values of 141 and 130 for Comparative Examples 3 and 4, respectively; and Examples 8 and 10 exhibit melt viscosity values of 131 and 147 pascal-seconds, respectively, relative to a value of 148 pascal-seconds for Comparative Example 6). For FPPE-containing samples at relatively low PEI content and FPPE-Si-containing samples at relatively high PEI content, unnotched Izod impact strength was desirably increased for inventive samples relative to comparative examples (e.g., Examples 1 and 2 exhibit unnotched Izod values of 98 and 52 kilojoules/meter$^2$, respectively, relative to values of 49 and 51 kilojoules/meter$^2$ for Comparative Examples 1 and 2; and Examples 8-10 exhibit unnotched Izod values of 101, 120, and 98 kilojoules/meter$^2$, respectively, relative to a value of 72 kilojoules/meter$^2$ for Comparative Example 6).

TABLE 2

| | C. Ex. 1 | C. Ex. 2 | Ex. 1 | Ex. 2 |
|---|---|---|---|---|
| | COMPOSITIONS | | | |
| AO1 | 0.3 | 0.3 | 0.3 | 0.3 |
| AO2 | 0.1 | 0.1 | 0.1 | 0.1 |
| PEI | 10 | 10 | 10 | 10 |
| DEPAL | 0 | 3 | 5 | 10 |
| FPPE | 43 | 40 | 38 | 33 |
| FPPE-Si | 0 | 0 | 0 | 0 |
| PA66 | 46.6 | 46.6 | 46.6 | 46.6 |

TABLE 2-continued

| PROPERTIES | | | | |
|---|---|---|---|---|
| Melt viscosity (Pa-sec) | 122 | 125 | 111 | 113 |
| Melt volume flow rate (cm³/10 min) | 45 | 41 | 44 | 43 |
| Tensile modulus (MPa) | 2729 | 2771 | 2918 | 3080 |
| Tensile strain at break (%) | 3.6 | 9.0 | 13.8 | 9.5 |
| Unnotched Izod impact strength (kJ/m²) | 49 | 51 | 98 | 52 |
| Unnotched Izod failure modes | C, C, C, P, C | C, C, C, C, C | C, P, C, C, C | C, C, C, C, C |
| Flexural modulus (MPa) | 2459 | 2509 | 2583 | 2734 |
| Flexural strength (MPa) | 100 | 100 | 100 | 100 |
| Vicat temperature (° C.) | 213 | 212 | 214 | 215 |
| UL94 at 1.6 mm | failure | failure | V-0 | V-0 |
| CTI (V) | 600 | 500 | 600 | 600 |

| | C. Ex. 3 | C. Ex. 4 | Ex. 3 | Ex. 4 |
|---|---|---|---|---|
| COMPOSITIONS | | | | |
| AO1 | 0.3 | 0.3 | 0.3 | 0.3 |
| AO2 | 0.1 | 0.1 | 0.1 | 0.1 |
| PEI | 20 | 20 | 20 | 20 |
| DEPAL | 0 | 3 | 5 | 10 |
| FPPE | 38 | 35 | 33 | 28 |
| FPPE-Si | 0 | 0 | 0 | 0 |
| PA66 | 41.6 | 41.6 | 41.6 | 41.6 |
| PROPERTIES | | | | |
| Melt viscosity (Pa-sec) | 141 | 130 | 111 | 116 |
| Melt volume flow rate (cm³/10 min) | 32 | 31 | 41 | 31 |
| Tensile modulus (MPa) | 2742 | 2833 | 2922 | 3108 |
| Tensile strain at break (%) | 3.7 | 10.8 | 5.4 | 5.9 |
| Unnotched Izod impact strength (kJ/m²) | 36 | 94 | 69 | 40 |
| Unnotched Izod failure modes | C, C, C, C, C | C, P, C, P, C | C, C, C, C, C | C, C, C, C, C |
| Flexural modulus (MPa) | 2510 | 2602 | 2679 | 2849 |
| Flexural strength (MPa) | 104 | 104 | 104 | 102 |
| Vicat temperature (° C.) | 212 | 213 | 214 | 214 |
| UL94 at 1.6 mm | failure | failure | V-0 | V-0 |
| CTI (V) | 600 | 350 | 275 | 425 |

| | C. Ex. 5 | Ex. 5 | Ex. 6 | Ex. 7 |
|---|---|---|---|---|
| COMPOSITIONS | | | | |
| AO1 | 0.3 | 0.3 | 0.3 | 0.3 |
| AO2 | 0.1 | 0.1 | 0.1 | 0.1 |
| PEI | 10 | 10 | 10 | 10 |
| DEPAL | 0 | 3 | 5 | 10 |
| FPPE | 0 | 0 | 0 | 0 |
| FPPE-Si | 43 | 40 | 38 | 33 |
| PA66 | 46.6 | 46.6 | 46.6 | 46.6 |
| PROPERTIES | | | | |
| Melt viscosity (Pa-sec) | 150 | 109 | 131 | 122 |
| Melt volume flow rate (cm³/10 min) | 23 | 45 | 38 | 34 |
| Tensile modulus (MPa) | 2541 | 2733 | 2773 | 3003 |
| Tensile strain at break (%) | 20.2 | 19.8 | 21.2 | 9.7 |
| Unnotched Izod impact strength (kJ/m²) | 137 | 123 | 111 | 51 |
| Unnotched Izod failure modes | P, P, P, P, P | P, P, P, C, C | P, C, P, P, C | C, C, C, C, C |
| Flexural modulus (MPa) | 2320 | 2449 | 2469 | 2700 |
| Flexural strength (MPa) | 96 | 96 | 94 | 93 |
| Vicat temperature (° C.) | 206 | 208 | 208 | 209 |
| UL94 at 1.6 mm | failure | V-1 | V-0 | V-0 |
| CTI (V) | 275 | 300 | 300 | 500 |

| | C. Ex. 6 | Ex. 8 | Ex. 9 | Ex. 10 |
|---|---|---|---|---|
| COMPOSITIONS | | | | |
| AO1 | 0.3 | 0.3 | 0.3 | 0.3 |
| AO2 | 0.1 | 0.1 | 0.1 | 0.1 |
| PEI | 20 | 20 | 20 | 20 |
| DEPAL | 0 | 3 | 5 | 10 |
| FPPE | 0 | 0 | 0 | 0 |
| FPPE-Si | 38 | 35 | 33 | 28 |
| PA66 | 41.6 | 41.6 | 41.6 | 41.6 |
| PROPERTIES | | | | |
| Melt viscosity (Pa-sec) | 148 | 131 | 126 | 147 |
| Melt volume flow rate (cm³/10 min) | 21 | 30 | 29 | 20 |
| Tensile modulus (MPa) | 2675 | 2801 | 2903 | 3087 |
| Tensile strain at break (%) | 19.9 | 16.7 | 16.9 | 12.9 |
| Unnotched Izod impact strength (kJ/m²) | 72 | 101 | 120 | 98 |
| Unnotched Izod failure modes | C, C, C, P, C | C, P, P, C, C | P, P, P, P, C | C, P, C, C, P |
| Flexural modulus (MPa) | 2447 | 2559 | 2631 | 2764 |
| Flexural strength (MPa) | 101 | 101 | 100 | 97 |
| Vicat temperature (° C.) | 209 | 209 | 209 | 207 |
| UL94 at 1.6 mm | failure | V-0 | V-0 | V-0 |
| CTI (V) | 250 | 300 | 300 | 400 |

The invention claimed is:

1. A composition comprising the product of melt blending:
   40 to 70 weight percent polyamide;
   20 to 50 weight percent acid-functionalized poly(phenylene ether);
   5 to 30 weight percent polyimide; and
   an amount of metal dialkylphosphinate effective to provide a flammability rating of V-1 or V-0 in the 20 mm Vertical Burning Flame Test of Underwriter's Laboratory Bulletin 94 "Tests for Flammability of Plastic Materials, UL 94";
   wherein all weight percents are based on the total weight of the composition.

2. The composition of claim 1, wherein the polyamide is selected from the group consisting of polyamide-6, polyamide-6,6, polyamide-4,6, polyamide-11, polyamide-12, polyamide-6,10, polyamide-6,12, polyamide 6/6,6, polyamide-6/6,12, polyamide MXD,6, polyamide-6,T, polyamide-6,I, polyamide-6/6,T, polyamide-6/6,I, polyamide-6,6/6,T, polyamide-6,6/6,I, polyamide-6/6,T/6,I, polyamide-6,6/6,T/6,I, polyamide-6/12/6,T, polyamide-6,6/12/6,T, polyamide-6/12/6,I, polyamide-6,6/12/6,I, and combinations thereof.

3. The composition of claim 1, wherein the polyamide is selected from the group consisting of polyamide-6, polyamide-6,6, and combinations thereof.

4. The composition of claim 1, wherein the polyamide comprises polyamide-6,6.

5. The composition of claim 1, wherein the acid-functionalized poly(phenylene ether) is the product of melt blending 95 to 99.5 parts by weight of a poly(phenylene ether) with 0.5 to 5 parts by weight of a functionalizing agent selected from the group consisting of citric acid, fumaric acid, maleic acid, maleic anhydride, and combinations thereof.

6. The composition of claim 5, wherein the poly(phenylene ether) comprises a homopolymer or copolymer of monomers selected from the group consisting of 2,6-dimethylphenol, 2,3,6-trimethylphenol, and combinations thereof.

7. The composition of claim 6, comprising 4 to 15 weight percent of the metal dialkylphosphinate.

8. The composition of claim 5, wherein the poly(phenylene ether) comprises a poly(phenylene ether)-polysiloxane block copolymer.

9. The composition of claim 8, comprising 2 to 15 weight percent of the metal dialkylphosphinate.

10. The composition of claim 8, wherein the poly(phenylene ether)-polysiloxane block copolymer contributes 0.4 to 4 weight percent of polysiloxane blocks to the composition.

11. The composition of claim 1, wherein the polyimide comprises a polyetherimide comprising 10 to 1000 repeating units having the structure

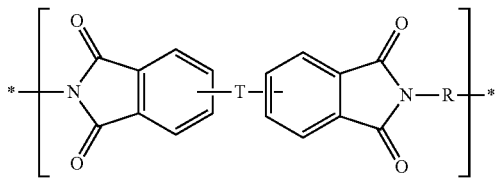

wherein T is —O— or a group of the formula —O—Z—O— wherein the divalent bonds of the —O— or the —O—Z—O— group are in the 3,3', 3,4', 4,3', or the 4,4' positions, and wherein Z is selected from the group consisting of

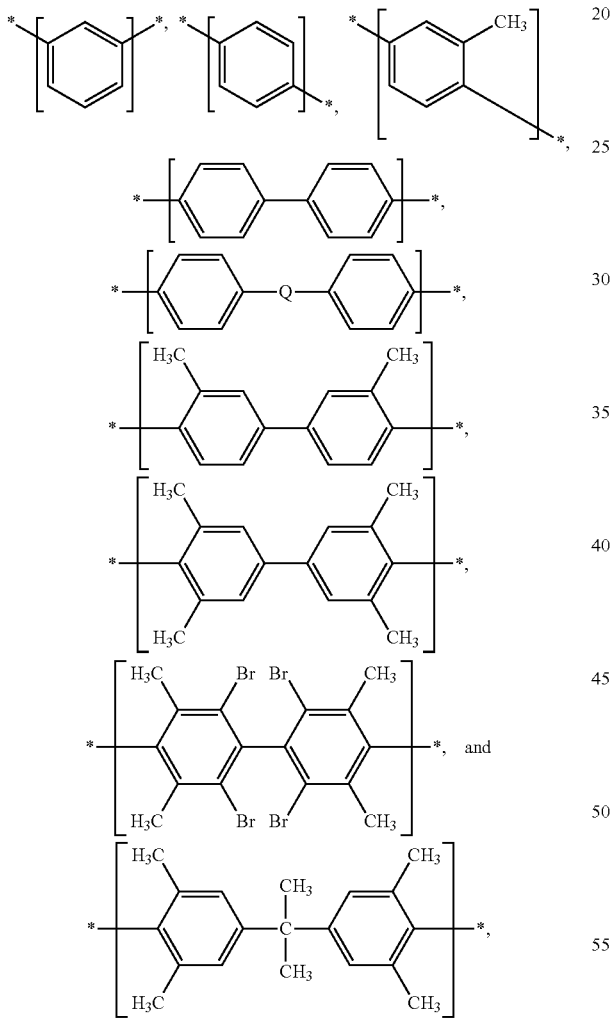

wherein Q is divalent moiety selected from the group consisting of —O—, —S—, —C(O)—, —SO$_2$—, —SO—, —C$_y$H$_2$— where y is 1 to 8, and —C$_p$H$_q$F$_r$— where p is from 1 to 8, q is 0 to 15, r is 1 to 16, and q+r=2p.

12. The composition of claim 1, further comprising 2 to 20 weight percent glass fibers.

13. The composition of claim 1, comprising less than 2 weight percent glass fibers.

14. The composition of claim 1,
wherein the polyamide comprises polyamide-6,6;
wherein the polyamide amount is 42 to 50 weight percent;
wherein the acid-functionalized poly(phenylene ether) is the product of melt blending 96 to 99 parts by weight of a poly(phenylene ether) with 1 to 4 parts by weight of a functionalizing agent selected from the group consisting of citric acid, fumaric acid, maleic acid, maleic anhydride, and combinations thereof; wherein the poly(phenylene ether) comprises a homopolymer or copolymer of monomers selected from the group consisting of 2,6-dimethylphenol, 2,3,6-trimethylphenol, and combinations thereof;
wherein the acid-functionalized poly(phenylene ether) amount is 30 to 48 weight percent;
wherein the polyimide comprises a polyetherimide comprising 10 to 1000 repeating units having the structure

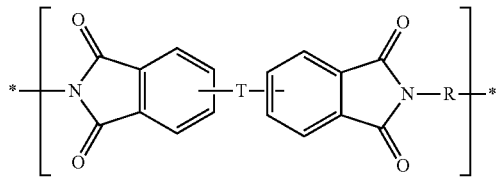

wherein T is —O— or a group of the formula —O—Z—O— wherein the divalent bonds of the —O— or the —O—Z—O— group are in the 3,3', 3,4', 4,3', or the 4,4' positions, and wherein Z is selected from the group consisting of

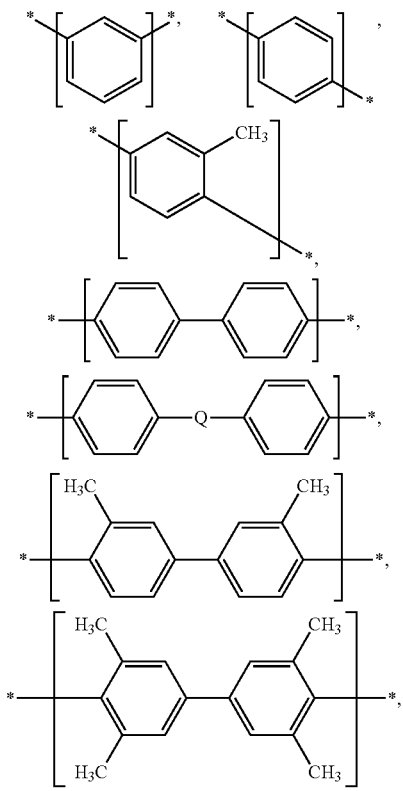

-continued

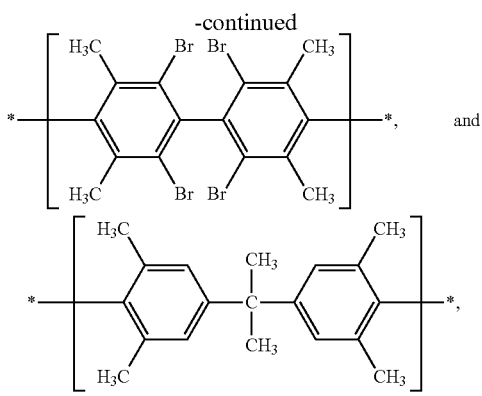

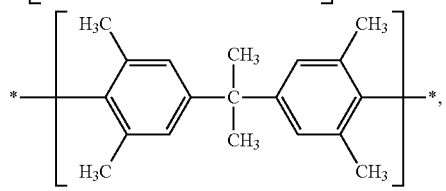

wherein Q is divalent moiety selected from the group consisting of —O—, —S—, —C(O)—, —SO$_2$—, —SO—, —C$_y$H$_2$— where y is 1 to 8, and —C$_p$H$_q$F$_r$— where p is from 1 to 8, q is 0 to 15, r is 1 to 16, and q+r=2p;

wherein the polyimide amount is 5 to 15 weight percent;

wherein the metal dialkylphosphinate comprises aluminum tris(diethylphosphinate); and wherein the metal dialkyphosphinate amount is 4 to 10 weight percent.

15. The composition of claim 1, wherein the polyamide comprises polyamide-6,6;

wherein the polyamide amount is 42 to 50 weight percent;

wherein the acid-functionalized poly(phenylene ether) is the product of melt blending 96 to 99 parts by weight of a poly(phenylene ether) with 1 to 4 parts by weight of a functionalizing agent selected from the group consisting of citric acid, fumaric acid, maleic acid, maleic anhydride, and combinations thereof; wherein the poly(phenylene ether) comprises a poly(phenylene ether)-polysiloxane block copolymer;

wherein the poly(phenylene ether)-polysiloxane block copolymer contributes 0.8 to 3 weight percent of polysiloxane blocks to the composition;

wherein the acid-functionalized poly(phenylene ether) amount is 30 to 48 weight percent;

wherein the polyimide comprises a polyetherimide comprising 10 to 1000 repeating units having the structure

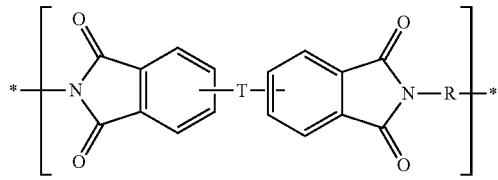

wherein T is —O— or a group of the formula —O—Z—O— wherein the divalent bonds of the —O— or the —O—Z—O— group are in the 3,3', 3,4', 4,3', or the 4,4' positions, and wherein Z is selected from the group consisting of

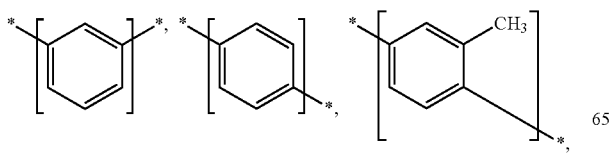

-continued

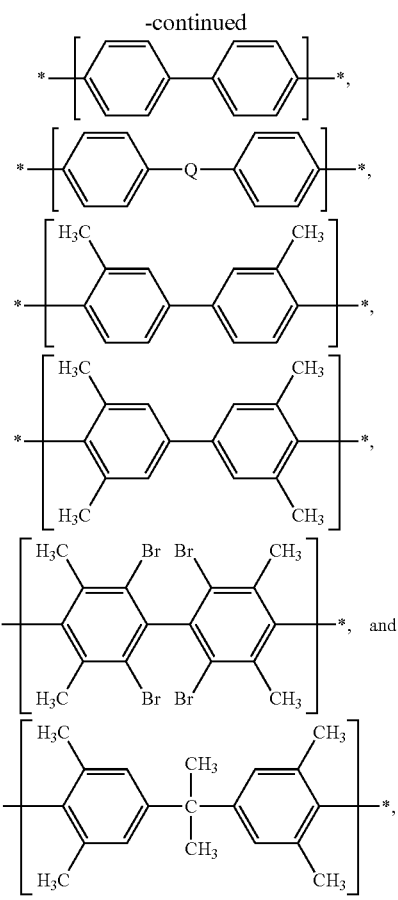

wherein Q is divalent moiety selected from the group consisting of —O—, —S—, —C(O)—, —SO$_2$—, —SO—, —C$_y$H$_2$— where y is 1 to 8, and —C$_p$R$_q$F$_r$— where p is from 1 to 8, q is 0 to 15, r is 1 to 16, and q+r=2p;

wherein the polyimide amount is 5 to 15 weight percent;

wherein the metal dialkylphosphinate comprises aluminum tris(diethylphosphinate); and wherein the metal dialkyphosphinate amount is 3 to 10 weight percent.

16. An article comprising a composition comprising the product of melt blending:

40 to 70 weight percent polyamide;

20 to 50 weight percent acid-functionalized poly(phenylene ether);

5 to 30 weight percent polyimide; and an amount of metal dialkylphosphinate effective to provide a flammability rating of V-1 or V-0 in the 20 mm Vertical Burning Flame Test of Underwriter's Laboratory Bulletin 94 "Tests for Flammability of Plastic Materials, UL 94";

wherein all weight percents are based on the total weight of the composition.

17. The article of claim 16, wherein the polyamide comprises polyamide-6,6;

wherein the polyamide amount is 42 to 50 weight percent;

wherein the acid-functionalized poly(phenylene ether) is the product of melt blending 96 to 99 parts by weight of a poly(phenylene ether) with 1 to 4 parts by weight of a functionalizing agent selected from the group consisting of citric acid, fumaric acid, maleic acid, maleic anhydride, and combinations thereof; wherein the poly(phenylene ether) comprises a homopolymer or copolymer of monomers selected from the group consisting of 2,6-dimethylphenol, 2,3,6-trimethylphenol, and combinations thereof;

wherein the acid-functionalized poly(phenylene ether) amount is 30 to 48 weight percent;

wherein the polyimide comprises a polyetherimide comprising 10 to 1000 repeating units having the structure

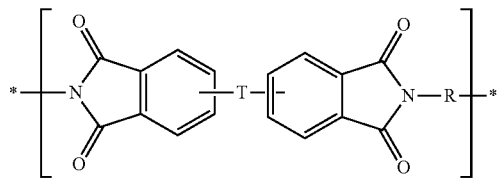

wherein T is —O— or a group of the formula —O—Z—O— wherein the divalent bonds of the —O— or the —O—Z—O— group are in the 3,3', 3,4', 4,3', or the 4,4' positions, and wherein Z is selected from the group consisting of

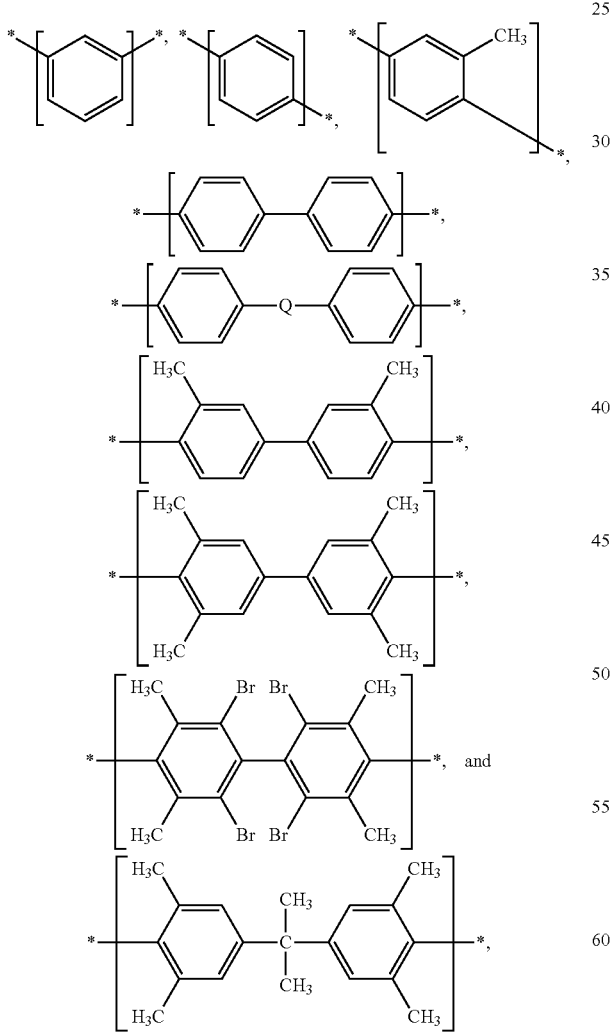

wherein Q is divalent moiety selected from the group consisting of —O—, —S—, —C(O)—, —SO$_2$—, —SO—, —C$_y$H$_2$— where y is 1 to 8, and —C$_p$H$_q$F$_r$— where p is from 1 to 8, q is 0 to 15, r is 1 to 16, and q+r=2p;

wherein the polyimide amount is 5 to 15 weight percent;

wherein the metal dialkylphosphinate comprises aluminum tris(diethylphosphinate); and wherein the metal dialkyphosphinate amount is 4 to 10 weight percent.

18. The article of claim 16, wherein the polyamide comprises polyamide-6,6;

wherein the polyamide amount is 42 to 50 weight percent;

wherein the acid-functionalized poly(phenylene ether) is the product of melt blending 96 to 99 parts by weight of a poly(phenylene ether) with 1 to 4 parts by weight of a functionalizing agent selected from the group consisting of citric acid, fumaric acid, maleic acid, maleic anhydride, and combinations thereof; wherein the poly(phenylene ether) comprises a poly(phenylene ether)-polysiloxane block copolymer;

wherein the poly(phenylene ether)-polysiloxane block copolymer contributes 0.8 to 3 weight percent of polysiloxane blocks to the composition;

wherein the acid-functionalized poly(phenylene ether) amount is 30 to 48 weight percent;

wherein the polyimide comprises a polyetherimide comprising 10 to 1000 repeating units having the structure

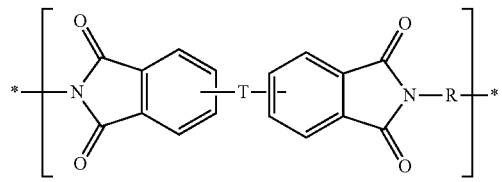

wherein T is —O— or a group of the formula —O—Z—O— wherein the divalent bonds of the —O— or the —O—Z—O— group are in the 3,3', 3,4', 4,3', or the 4,4' positions, and wherein Z is selected from the group consisting of

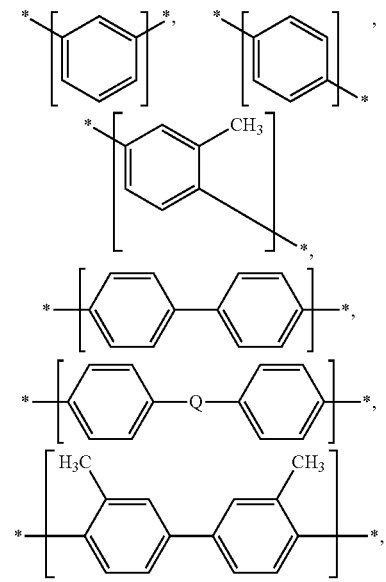

-continued

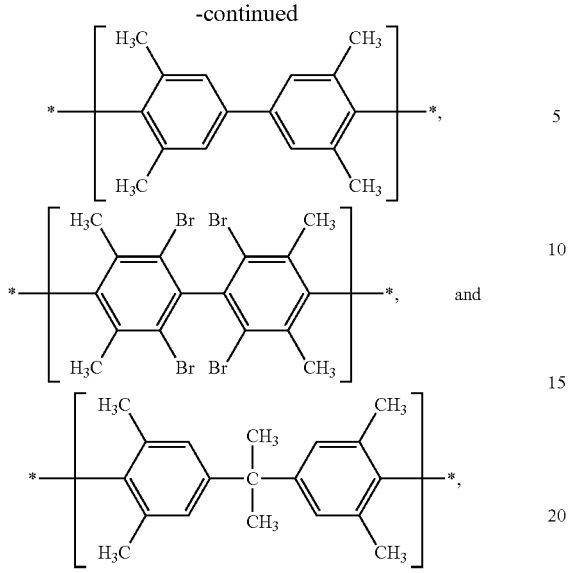

wherein Q is divalent moiety selected from the group consisting of —O—, —S—, —C(O)—, —SO$_2$—, —SO—, —C$_y$H$_2$— where y is 1 to 8, and —C$_p$R$_q$F$_r$— where p is from 1 to 8, q is 0 to 15, r is 1 to 16, and q+r=2p;

wherein the polyimide amount is 5 to 15 weight percent;

wherein the metal dialkylphosphinate comprises aluminum tris(diethylphosphinate); and wherein the metal dialkyphosphinate amount is 3 to 10 weight percent.

* * * * *